United States Patent
Lu et al.

(10) Patent No.: US 12,332,461 B2
(45) Date of Patent: Jun. 17, 2025

(54) LIQUID CRYSTAL GRATING AND STEREOSCOPIC DISPLAY DEVICE

(71) Applicant: Shanghai Tianma Microelectronics Co., Ltd., Shanghai (CN)

(72) Inventors: Feng Lu, Shanghai (CN); Yang Zeng, Shanghai (CN); Shengtao Zhu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/369,905

(22) Filed: Sep. 19, 2023

(65) Prior Publication Data

US 2024/0004214 A1 Jan. 4, 2024

(30) Foreign Application Priority Data

Mar. 31, 2023 (CN) .......................... 202310349553.7

(51) Int. Cl.
*G02B 30/26* (2020.01)
*G02F 1/1343* (2006.01)

(52) U.S. Cl.
CPC ....... *G02B 30/26* (2020.01); *G02F 1/134309* (2013.01)

(58) Field of Classification Search
CPC ...... G02F 1/134309; G02F 1/29; G02F 1/292; G02B 30/26
See application file for complete search history.

(56) References Cited

U.S. PATENT DOCUMENTS

2015/0293409 A1* 10/2015 Usukura ............... G02F 1/1337
349/123

FOREIGN PATENT DOCUMENTS

| CN | 203480184 U | | 3/2014 |
| JP | 2005099689 A | * | 4/2005 |

OTHER PUBLICATIONS

Espacenet English machine translation of JP2005099689A (Year: 2005).*

* cited by examiner

*Primary Examiner* — Michael H Caley
*Assistant Examiner* — David Y Chung
(74) *Attorney, Agent, or Firm* — KDW Firm PLLC

(57) ABSTRACT

Provided are a liquid crystal grating and a stereoscopic display device. A liquid crystal grating includes a first substrate, a second substrate and a liquid crystal layer, where the liquid crystal layer is located between the first substrate and the second substrate. The liquid crystal grating includes multiple grating units which are arranged along a first direction, where a grating unit includes multiple first electrodes and multiple second electrodes; the multiple first electrodes are located between the first substrate and the liquid crystal layer and are disposed at intervals from each other along the first direction; the multiple second electrodes are located between the second substrate and the liquid crystal layer and are disposed at intervals from each other along the first direction. At least two first electrodes have different voltages, and at least two second electrodes have different voltages.

20 Claims, 14 Drawing Sheets

LIQUID CRYSTAL GRATING AND STEREOSCOPIC DISPLAY DEVICE

CROSS-REFERENCE TO RELATED APPLICATION(S)

This application claims priority to Chinese Patent Application No. 202310349553.7 filed Mar. 31, 2023, the disclosure of which is incorporated herein by reference in its entirety.

TECHNICAL FIELD

The present disclosure relates to the field of display technologies and, in particular, to a liquid crystal grating and a stereoscopic display device.

BACKGROUND

Since the two-dimensional display is difficult to clearly express three-dimensional depth information accurately, people have been continuously investigating a display technology that can display stereoscopic scenes, that is, the three-dimensional image display technology. The holographic three-dimensional display technology utilizes the diffraction or interference of light to record the amplitude and phase information of object light, and then reconstructs the information of the object light through the diffraction of light. The holographic three-dimensional display technology is the only real three-dimensional display technology among various display methods.

When displaying a three-dimensional image, the stereoscopic display device forms a left-eye image and a right-eye image through the diffraction function of a liquid crystal grating after a spatial light modulator (SLM) performs phase modulation and amplitude modulation on optical signals. How to improve the display effect has become an urgent problem to be solved.

SUMMARY

The present disclosure provides a liquid crystal grating and a stereoscopic display device so that the intensity of the transverse electric field on a single substrate is reduced. Therefore, the adverse impact of the transverse electric field on the rotation of liquid crystal molecules is reduced and the problem of antiphase domains is alleviated.

In a first aspect, embodiments of the present disclosure provide a liquid crystal grating. The liquid crystal grating includes a first substrate, a second substrate and a liquid crystal layer, and the liquid crystal layer is located between the first substrate and the second substrate.

The liquid crystal grating includes multiple grating units which are arranged along a first direction, where a grating unit includes multiple first electrodes and multiple second electrodes. Multiple first electrodes are located between the first substrate and the liquid crystal layer and are disposed at intervals from each other along the first direction. Multiple second electrodes are located between the second substrate and the liquid crystal layer and are disposed at intervals from each other along the first direction.

At least two first electrodes have different voltages, and at least two second electrodes have different voltages.

In a second aspect, the embodiments of the present disclosure provide a stereoscopic display device. The stereoscopic display device includes a light source, a spatial light modulator and a grating component which are disposed sequentially.

The gating component includes at least one liquid crystal grating according to the first aspect.

According to the liquid crystal grating provided in the embodiments of the present disclosure, at least two first electrodes have different voltages, and a transverse electric field is generated between the first electrodes. At least two second electrodes have different voltages, and a transverse electric field is generated between the second electrodes. In this manner, transverse electric fields are distributed on first electrodes and second electrodes, that is, transverse electric fields are distributed on the first substrate and the second substrate, rather than concentrated on a single substrate (substrates include the first substrate and the second substrate), so that the intensity of the transverse electric field on a single substrate is reduced. Therefore, the adverse impact of the transverse electric field on the rotation of liquid crystal molecules is reduced and the problem of antiphase domains is alleviated.

DETAILED DESCRIPTION

Figure 1:
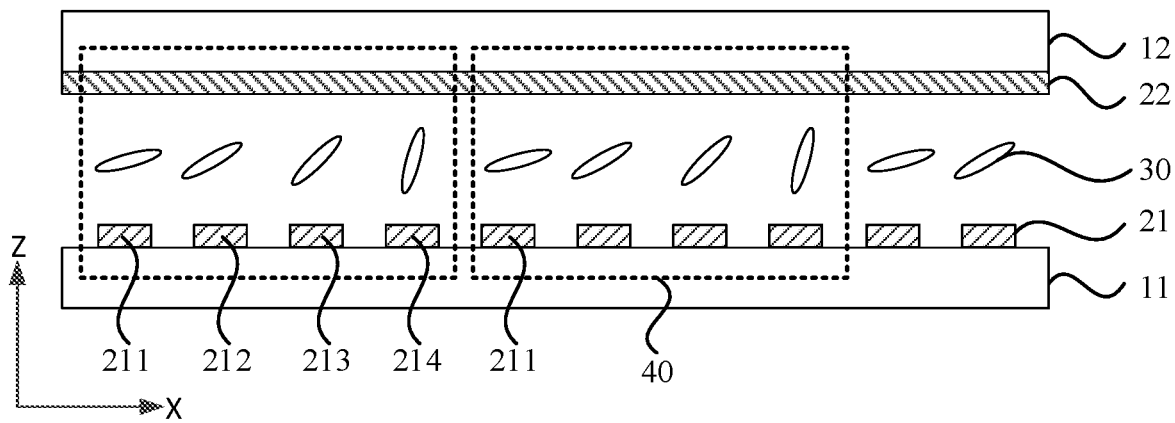
FIG. 1 is a sectional view of a liquid crystal grating in the related art.

Hereinafter the present disclosure is further described in detail in conjunction with the drawings and embodiments. It is to be understood that the embodiments described herein are intended to illustrate and not to limit the present disclosure. Additionally, it is to be noted that for ease of description, only part, not all, of structures related to the present disclosure are illustrated in the drawings.

FIG. 1 is a sectional view of a liquid crystal grating in the research process. Referring to FIG. 1, a liquid crystal grating includes a first substrate 11, a second substrate 12 and a liquid crystal layer 30. The liquid crystal layer 30 is located between the first substrate 11 and the second substrate 12, and the liquid crystal layer 30 includes liquid crystal molecules. The liquid crystal grating includes multiple grating units 40. The grating units 40 are arranged along a first direction X, and a grating unit 40 includes multiple first electrodes 21 and a first second electrode 22. The first electrodes 21 are located between the first substrate 11 and the liquid crystal layer 30. The first electrodes 21 are disposed at intervals from each other along the first direction X. Along the first direction X, a certain distance exists between two adjacent first electrodes 21. The grating units 40 share the same second electrode 22, and the second electrode 22 is a whole-surface electrode.

Figure 2:
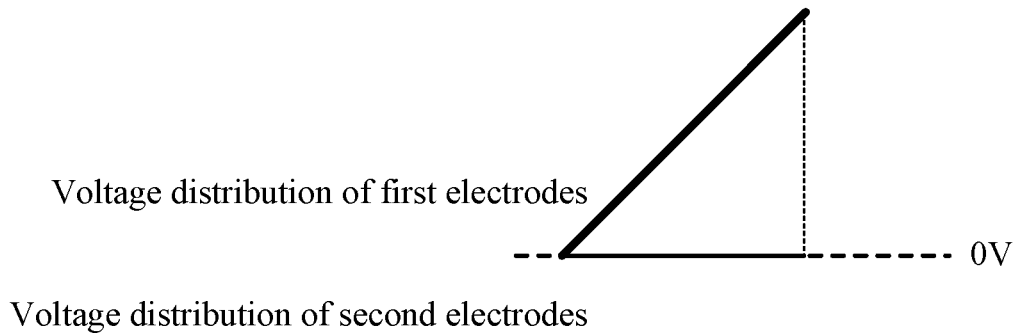
FIG. 2 is a diagram showing the voltage distribution of first electrodes and a second electrode in the related art.

FIG. 2 is a diagram showing the voltage distribution of first electrodes and a second electrode of a liquid crystal grating in the research process. Referring to FIG. 1 and FIG. 2, according to the related research, it is found that a voltage difference exists between a first electrode 21 and the second electrode 22 during stereoscopic display. A longitudinal electric field formed by the first electrode and the second electrode can drive liquid crystal molecules to rotate. At least two first electrodes 21 have different voltages, and then longitudinal electric fields of different intensities which are arranged along the first direction X are formed. The longitudinal electric fields of different intensities cause liquid crystal molecules to rotate by different angles, forming a refractive index gradient, and multiple grating units 40 which are arranged along the first direction X are formed. Therefore, a grating unit 40 may also include liquid crystal molecules. However, a transverse electric field is formed between first electrodes 21 of different voltages. The transverse electric field will lead to a flexoelectric effect of liquid crystal molecules, changing the rotation behavior of the liquid crystal molecules. As a result, the liquid crystal molecules in the liquid crystal grating cannot flip in conformity to the ideal situation while rotating towards the direction opposite to a pre-tilt angle, leading to the problem of antiphase domains.

Figure 3:
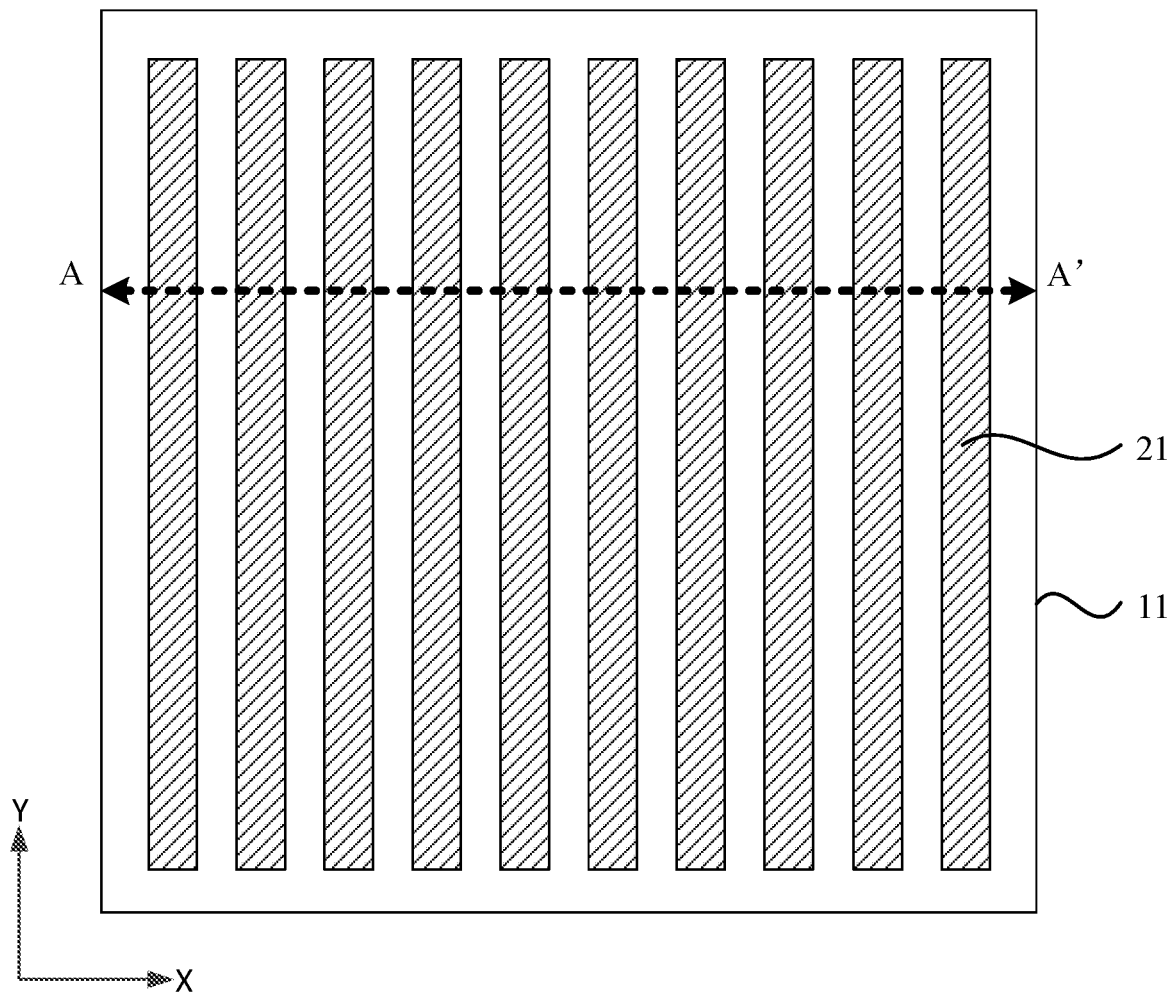
FIG. 3 is a top view of a liquid crystal grating according to an embodiment of the present disclosure.
Figure 4:
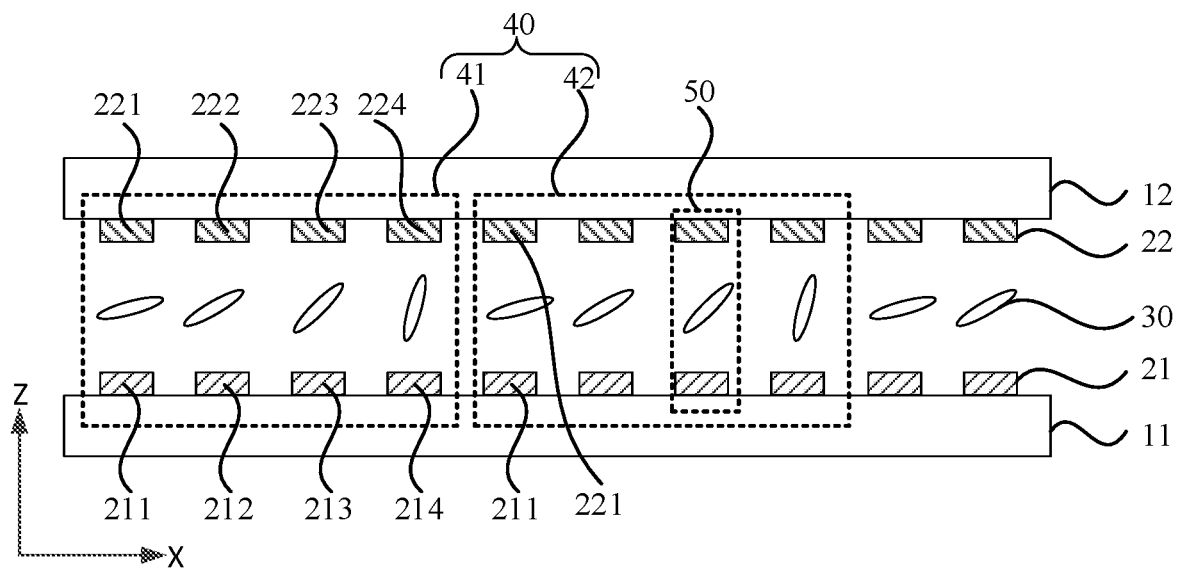
FIG. 4 is a sectional view taken along direction A-A' in FIG. 3.

FIG. 3 is a top view of a liquid crystal grating according to an embodiment of the present disclosure, and the second electrode 22 and the second substrate 12 are omitted in FIG. 3. FIG. 4 is a sectional view taken along direction A-A' in FIG. 3. Referring to FIG. 3 and FIG. 4, a grating unit 40 includes multiple first electrodes 21 and multiple second electrodes 22. The first electrodes 21 are located between the first substrate 11 and the liquid crystal layer 30, and the first electrodes 21 are disposed at intervals from each other along the first direction X. The second electrodes 22 are located between the second substrate 12 and the liquid crystal layer 30, and the second electrodes 22 are disposed at intervals from each other along the first direction X. Along the first direction X, a certain distance exists between two adjacent second electrodes 22. At least two first electrodes 21 have different voltages, and at least two second electrodes 22 have different voltages.

For the liquid crystal grating provided in the embodiment of the present disclosure, at least two first electrodes 21 have different voltages, and a transverse electric field is generated between the first electrodes 21. At least two second electrodes 22 have different voltages, and a transverse electric field is generated between the second electrodes 22. In this manner, transverse electric fields are distributed on first electrodes 21 and second electrodes 22, that is, transverse electric fields are distributed on the first substrate 11 and the second substrate 12, rather than concentrated on a single substrate (substrates include the first substrate 11 and the second substrate 12), so that the intensity of the transverse electric field on a single substrate is reduced. Therefore, the adverse impact of the transverse electric field on the rotation of liquid crystal molecules is reduced and the problem of antiphase domains is alleviated.

Exemplarily, referring to FIG. 3 and FIG. 4, during stereoscopic display, a voltage difference exists between a first electrode 21 and a second electrode 22. A longitudinal electric field formed between the first electrode 21 and the second electrode 22 can drive liquid crystal molecules to rotate, and multiple grating units 40 are formed. The grating units 40 are arranged repeatedly along the first direction X. The liquid crystal gating is used for light diffraction and deflection. When stereoscopic display is not performed, no grating unit 40 is formed, and the liquid crystal grating is not configured for or assists in light diffraction and deflection. The direction of the longitudinal electric field may be a third direction Z or the opposite direction of the third direction Z.

Exemplarily, referring to FIG. 3 and FIG. 4, in the same grating unit 40, at least two first electrodes 21 have different voltages, and at least two second electrodes 22 have different voltages. In the same grating unit 40, transverse electric fields are distributed on the first substrate 11 and the second substrate 12, so that the adverse impact of the transverse electric field on the rotation of liquid crystal molecules is reduced and the problem of antiphase domains is alleviated.

Optionally, referring to FIG. 4, the same grating unit 40 includes multiple electrode groups 50 which are arranged along the first direction X. An electrode group 50 includes at least one first electrode 21 and at least one second electrode 22. In the same electrode group 50, a first electrode 21 at least partially overlaps a second electrode 22; that is, a first electrode 21 overlaps a second electrode 22, or a first electrode 21 partially overlaps a second electrode 22. The voltage difference between the first electrode 21 and the second electrode 22 is a first voltage difference. The longitudinal electric field formed by the first voltage difference can drive liquid crystal molecules to rotate. The first voltage difference is a difference between a voltage of a first electrode 21 and a voltage of a second electrode 22, that is, the first voltage difference is a voltage of a first electrode 21 minus a voltage of the second electrode 22.

Exemplarily, referring to FIG. 4, an electrode group 50 includes a first electrode 21 and a second electrode 22. The first voltage difference exists between voltages of a first electrode 21 and a second electrode 22 in the same electrode group 50. In other implementations, an electrode group 50 includes multiple first electrodes 21 and a second electrode 22.

Figure 5:
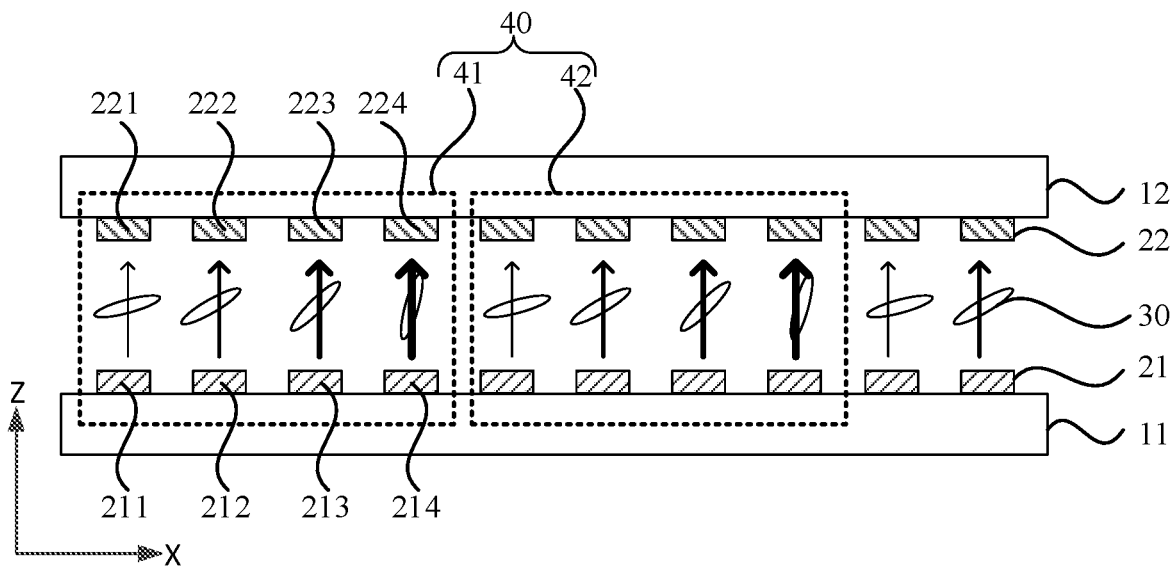
FIG. 5 is a diagram of first voltage differences forming electric fields according to an embodiment of the present disclosure.

FIG. 5 is a diagram of first voltage differences forming electric fields according to an embodiment of the present disclosure. Referring to FIG. 5, various first voltage differences have the same polarity. Longitudinal electric fields (longitudinal electric fields illustrated by arrows in FIG. 5) formed by first electrodes 21 and second electrodes 22 have the same electric field direction. The longitudinal electric fields formed by the first electrodes 21 and the second electrodes 22 drive liquid crystal molecules to rotate towards the same direction.

Exemplarily, referring to FIG. 5, multiple first electrodes 21 include first sub-first electrodes 211, second sub-first electrodes 212, third sub-first electrodes 213 and fourth sub-first electrodes 214. Multiple second electrodes 22 include first sub-second electrodes 221, second sub-second electrodes 222, third sub-second electrodes 223 and fourth sub-second electrodes 224. A voltage of a first sub-first electrode 211 is greater than a voltage of a first sub-second electrode 221, and a positive first voltage difference is formed between the first sub-first electrode 211 and the first sub-second electrode 221. A voltage of a second sub-first electrode 212 is greater than a voltage of a second sub-second electrode 222, and a positive first voltage difference is formed between the second sub-first electrode 212 and the second sub-second electrode 222. A voltage of a third sub-first electrode 213 is greater than a voltage of a third sub-second electrode 223, and a positive first voltage difference is formed between the third sub-first electrode 213 and the third sub-second electrode 223. A voltage of a fourth sub-first electrode 214 is greater than a voltage of a fourth sub-second electrode 224, and a positive first voltage difference is formed between the fourth sub-first electrode 214 and the fourth sub-second electrode 224. Arrows in FIG. 5 represent longitudinal electric fields, and the thickness of the arrows indicates the intensity of the longitudinal electric fields. The thicker the arrow, the stronger the longitudinal electric field, the larger the first voltage difference.

Figure 6:
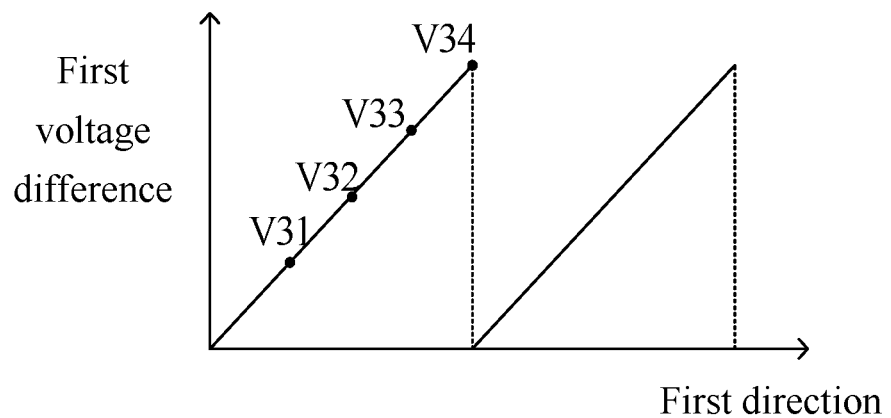
FIG. 6 is a diagram of first voltage differences according to an embodiment of the present disclosure.

FIG. 6 is a diagram of first voltage differences according to an embodiment of the present disclosure. Referring to FIG. 5 and FIG. 6, in the same grating unit 40, along the first direction, various first voltage differences gradually increase, intensities of longitudinal electric fields formed by various electrode groups 50 gradually increase, and rotation angles of liquid crystal molecules gradually increase. In other implementations, in the same grating unit 40, along the first direction, first voltage differences gradually decrease. It is to be understood that in the same grating unit 40, due to the gradual increase or gradual decrease of the first voltage differences along the first direction, a jump occurs in first voltage differences of two adjacent grating units 40. Accordingly, refractive indexes formed by liquid crystal molecules gradually change in the same grating unit 40, and a jump occurs in refractive indexes at the boundary of two adjacent grating units 40, and thus a grating with the diffraction function is formed.

Optionally, referring to FIG. 4 to FIG. 6, a grating unit 40 includes M electrode groups 50, where M is a positive integer greater than 1. In the same grating unit 40, along the first direction X, first voltage differences corresponding to the first electrode group 50 to the M-th electrode group 50 vary linearly. In the same grating unit 40, intensities of longitudinal electric fields formed by various electrode groups 50 increase or decrease linearly. Since the rotation angle of liquid crystal molecules is in direct proportion to the intensity of the longitudinal electric field, various first voltage differences which vary linearly result in refractive indexes of liquid crystal molecules which vary linearly, so that the optical path is simplified. In other implementations, the first voltage differences corresponding to the first electrode group 50 to the M-th electrode group 50 change in other rules.

Exemplarily, referring to FIG. 4 to FIG. 6, an example where M=4 is illustrated. The first voltage difference formed by the first sub-first electrode 211 and the first sub-second electrode 221 is denoted as V31, the first voltage difference formed by the second sub-first electrode 212 and the second sub-second electrode 222 is denoted as V32, the first voltage difference formed by the third sub-first electrode 213 and the third sub-second electrode 223 is donated as V33, and the first voltage difference formed by the fourth sub-first electrode 214 and the fourth sub-second electrode 224 is donated as V34. The values of V31, V32, V33 and V34 increase linearly along the line connecting the V31, V32, V33 and V34. In other implementations, a grating unit 40 includes electrode groups 50 of other numbers.

Figure 7:
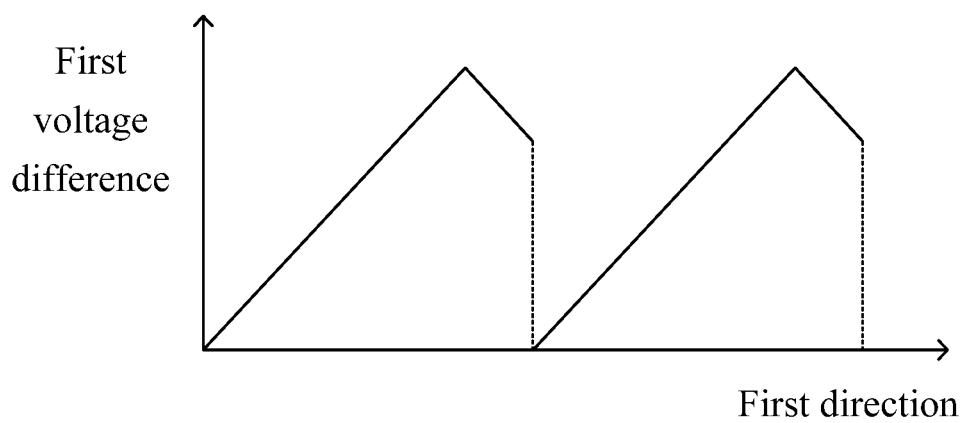
FIG. 7 is another diagram of first voltage differences according to an embodiment of the present disclosure.

FIG. 7 is another diagram of first voltage differences according to an embodiment of the present disclosure. Referring to FIG. 7, in the same grating unit 40, along the first direction, first voltage differences corresponding to various electrode groups 50 first increase and then decrease.

In the same grating unit 40, along the first direction X, the variations of the first voltage differences corresponding to the various electrode groups 50 follow a broken-line trend.

Figure 8:
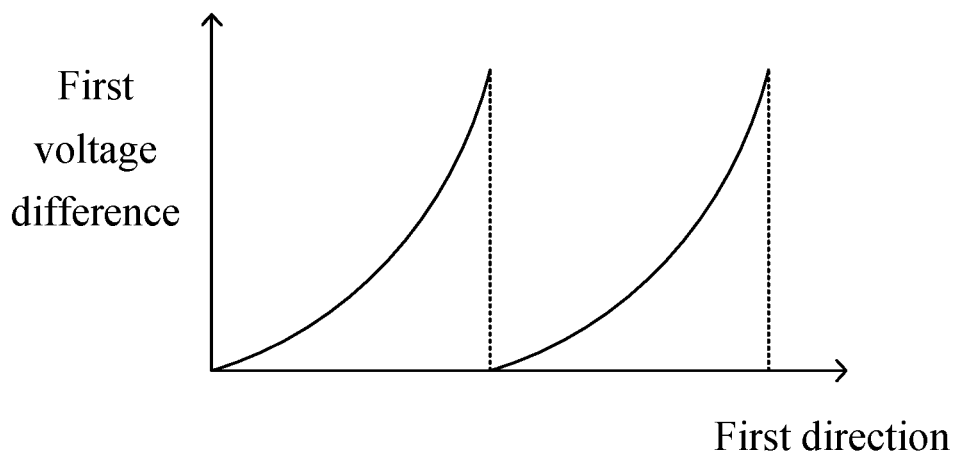
FIG. 8 is another diagram of first voltage differences according to an embodiment of the present disclosure.

FIG. 8 is another diagram of first voltage differences according to an embodiment of the present disclosure. Referring to FIG. 8, in the same grating unit 40, along the first direction, first voltage differences corresponding to various electrode groups 50 gradually increase. In the same grating unit 40, along the first direction X, the variations of the first voltage differences corresponding to the various electrode groups 50 follow a curve trend.

Figure 9:
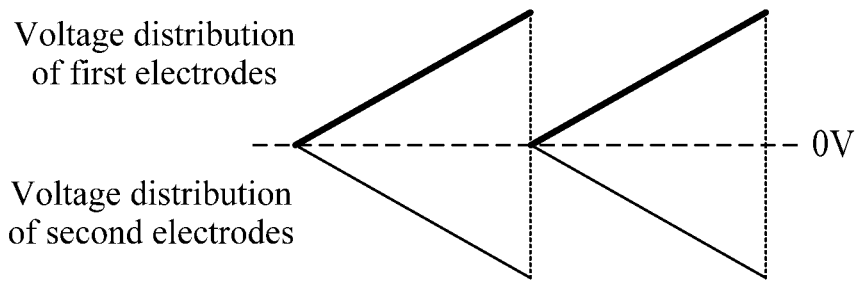
FIG. 9 is a diagram showing the voltage distribution of first electrodes and second electrodes according to an embodiment of the present disclosure.

FIG. 9 is a diagram showing the voltage distribution of first electrodes and second electrodes according to an embodiment of the present disclosure. Referring to FIG. 4 to FIG. 6 and FIG. 9, in the same grating unit 40, along the first direction X, voltages of various first electrodes 21 gradually increase, and voltages of various second electrodes 22 gradually decrease. In the same grating unit 40, first voltage differences corresponding to various electrode groups 50 gradually increase.

In other implementations, in the same grating unit 40, along the first direction X, voltages of various first electrodes 21 gradually decrease, and voltages of various second electrodes 22 gradually increase. In the same grating unit 40, first voltage differences corresponding to various electrode groups 50 gradually decrease.

Optionally, referring to FIG. 4 and FIG. 9, a grating unit includes M first electrodes 21 and N second electrodes 22, where M and N are each a positive integer greater than 1. Along the first direction X, voltages of the first first electrode 21 to the M-th first electrode 21 vary linearly, that is, voltages of the first first electrode 21 to the last first electrode 21 vary linearly. Voltages of the first second electrode 22 to the N-th second electrode 22 vary linearly, that is, voltages of the first second electrode 22 to the last second electrode 22 vary linearly.

Exemplarily, referring to FIG. 4 and FIG. 9, an electrode group 50 includes a first electrode 21 and a second electrode 22, where M=N=4. In the same grating unit 40, along the first direction X, voltages of the first first electrode 21 to the fourth first electrode 21 vary linearly, and voltages of the first second electrode 22 to the fourth second electrode 22 vary linearly. In other implementations, the voltages of the first first electrode 21 to the last first electrode 21 change in other rules, and/or, the voltages of the first second electrode 22 to the last second electrode 22 change in other rules.

Figure 10:
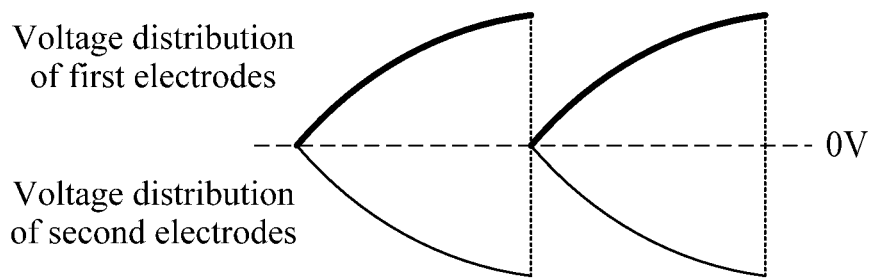
FIG. 10 is another diagram showing the voltage distribution of first electrodes and second electrodes according to an embodiment of the present disclosure.

FIG. 10 is another diagram showing the voltage distribution of first electrodes and second electrodes according to an embodiment of the present disclosure. In the same grating unit 40, along the first direction, voltages of the first first electrode 21 to the last first electrode 21 gradually increase, and the variations of the voltages of various first electrodes 21 follow a curve trend. In the same grating unit 40, along the first direction, voltages of the first second electrode 22 to the last second electrode 22 gradually decrease, and the variations of the voltages of various second electrodes 22 follow a curve trend.

Optionally, referring to FIG. 4, the number of first electrodes 21 is the same as the number of second electrodes 22. Along a direction perpendicular to a plane where the first substrate 11 is located, each of the first electrodes 21 corresponds to a respective one of the second electrodes 22; a first electrode 21 overlaps with a second electrode 22 that is in one-to-one correspondence with the first electrode 21, and a first electrode 21 and a second electrode 22 which are in one-to-one correspondence are located in the same electrode group 50.

Exemplarily, referring to FIG. 4, along the direction perpendicular to the plane where the first substrate 11 is located, a first electrode 21 exactly coincides to a second electrode 22 that is in one-to-one correspondence with the first electrode 21. A first electrode 21 and a second electrode 22 which are in one-to-one correspondence occupy the same region along the direction perpendicular to the plane where the first substrate 11 is located.

Optionally, referring to FIG. 4 and FIG. 9, for a first electrode 21 and a second electrode 22 which are in one-to-one correspondence, the voltage of the first electrode 21 and the voltage of the second electrode 22 have the same value and opposite polarities. In this manner, transverse electric fields are uniformly distributed on the first electrodes 21 and the second electrodes 22, that is, transverse electric fields are distributed on the first substrate 11 and the second substrate 12. The transverse electric field between first electrodes 21 on the first substrate 11 is the same as the transverse electric field between second electrodes 22 on the second substrate 12, so that the intensity of the transverse electric field on a single substrate is reduced.

Exemplarily, referring to FIG. 1 and FIG. 2, the voltage of the first sub-first electrode 211 is +1V, the voltage of the second sub-first electrode 212 is +2V, the voltage of the third sub-first electrode 213 is +3V, and the voltage of the fourth sub-first electrode 214 is +4V. The voltage of the second electrode 22 is 0V. A voltage difference formed between the first sub-first electrode 211 and the second electrode 22 is 1V, a voltage difference formed between the second sub-first electrode 212 and the second electrode 22 is 2V, a voltage difference formed between the third sub-first electrode 213 and the second electrode 22 is 3V, and a voltage difference formed between the fourth sub-first electrode 214 and the second electrode 22 is 4V. A voltage difference formed between the fourth sub-first electrode 214 and a first sub-first electrode 211 in an adjacent grating unit 40 is 3V. The transverse electric field formed between the first electrodes 21 is relatively strong, causing liquid crystal molecules to fail to flip according to the ideal situation; and the liquid crystal molecules rotate to a direction opposite to a pre-tilt angle, resulting in the problem of antiphase domains.

Exemplarily, referring to FIG. 4 to FIG. 6 and FIG. 9, the voltage of the first sub-first electrode 211 is +0.5V, the voltage of the second sub-first electrode 212 is +1V, the voltage of the third sub-first electrode 213 is +1.5V, and the voltage of the fourth sub-first electrode 214 is +2V. The voltage of the first sub-second electrode 221 is −0.5V, the voltage of the second sub-second electrode 222 is −1V, the voltage of the third sub-second electrode 223 is −1.5V, and the voltage of the fourth sub-second electrode 224 is −2V. A voltage difference formed between the first sub-first electrode 211 and the first sub-second electrode 221 is 1V, a voltage difference formed between the second sub-first electrode 212 and the second sub-second electrode 222 is 2V, a voltage difference formed between the third sub-first electrode 213 and the third sub-second electrode 223 is 3V, and a voltage difference formed between the fourth sub-first electrode 214 and the fourth sub-second electrode 224 is 4V. The voltage difference formed between the fourth sub-first electrode 214 and the first sub-first electrode 211 in the adjacent grating unit 40 is 1.5V. A voltage difference formed between the fourth sub-second electrode 224 and a first sub-second electrode 221 in an adjacent grating unit 40 is 1.5V. In this manner, the transverse electric field formed between the first electrodes 21 is reduced, so that the adverse impact of the transverse electric field on the rotation of liquid crystal molecules is reduced, and thus the problem of antiphase domains is alleviated.

Figure 11:
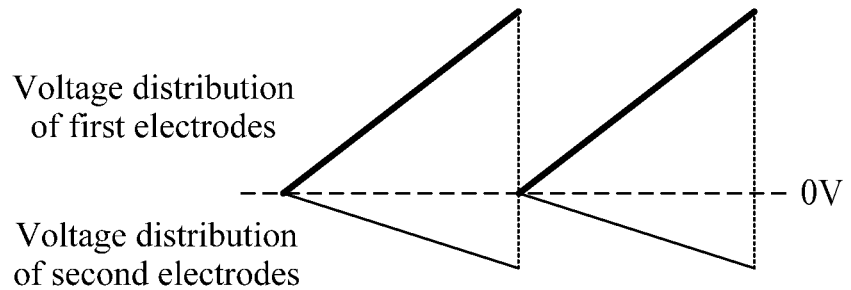
FIG. 11 is another diagram showing the voltage distribution of first electrodes and second electrodes according to an embodiment of the present disclosure.

FIG. 11 is another diagram showing the voltage distribution of first electrodes and second electrodes according to an embodiment of the present disclosure. Referring to FIG. 4 and FIG. 11, in the same grating unit 40, along the first direction X, voltages of the first first electrode 21 to the last first electrode 21 increase linearly, and voltages of the first second electrode 22 to the last second electrode 22 decrease linearly. An absolute value of a voltage rate of change of various first electrodes 21 is greater than an absolute value of a voltage rate of change of various second electrodes 22. In other implementations, in the same grating unit 40, an absolute value of a voltage rate of change of various first electrodes 21 is less than an absolute value of a voltage rate of change of various second electrodes 22.

Figure 12:
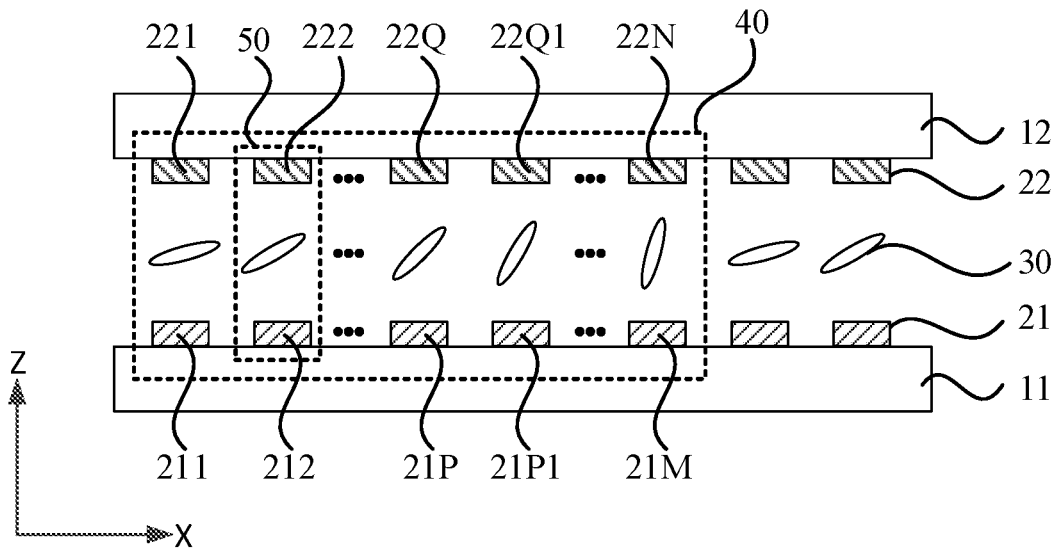
FIG. 12 is a sectional view of another liquid crystal grating according to an embodiment of the present disclosure.
Figure 13:
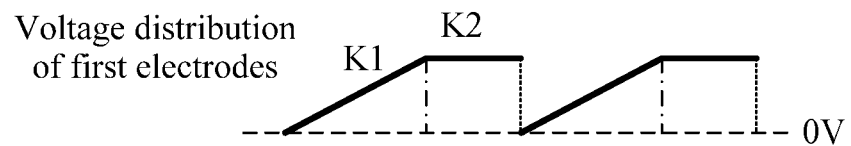
FIG. 13 is another diagram showing the voltage distribution of first electrodes according to an embodiment of the present disclosure.

FIG. 12 is a sectional view of another liquid crystal grating according to an embodiment of the present disclosure, and FIG. 13 is another diagram showing the voltage distribution of first electrodes according to an embodiment of the present disclosure. Referring to FIG. 12 and FIG. 13, a grating unit 40 includes M first electrodes 21, where M is a positive integer greater than 1. Along the first direction X, voltages of the first first electrode 21 to the P-th first electrode 21 vary linearly according to a first rate K1 of change, and voltages of the (P+1)-th first electrode 21 to the M-th first electrode 21 vary linearly according to a second rate K2 of change, where 1<P<M. An absolute value of the first rate K1 of change is not equal to an absolute value of the second rate K2 of change. In the same grating unit 40, along the first direction X, variations of voltages of various first electrodes 21 follow a broken-line trend.

Exemplarily, referring to FIG. 12, an electrode group 50 includes a first electrode 21 and a second electrode 22. First electrodes 21 include a first sub-first electrode 211, a second sub-first electrode 212, ..., a P-th sub-first electrode 21P, a (P+1)-th sub-first electrode 21P1, ... and an M-th sub-first electrode 21M which are arranged in order. In the same grating unit 40, the first sub-first electrode 211 is the first first electrode 21, the second sub-first electrode 212 is the second first electrode 21, the P-th sub-first electrode 21P is the P-th first electrode 21, the (P+1)-th sub-first electrode 21P1 is the (P+1)-th first electrode 21, and the M-th sub-first electrode 21M is the M-th first electrode 21. Voltages of the first sub-first electrode 211 to the P-th sub-first electrode 21P vary linearly according to the first rate K1 of change. Voltages of the (P+1)-th sub-first electrode 21P1 to the M-th sub-first electrode 21M vary linearly according to the second rate K2 of change.

Figure 14:
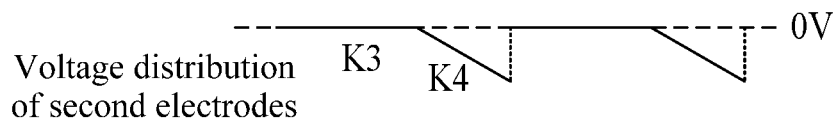
FIG. 14 is another diagram showing the voltage distribution of second electrodes according to an embodiment of the present disclosure.

FIG. 14 is another diagram showing the voltage distribution of second electrodes according to an embodiment of the present disclosure. Referring to FIG. 12 and FIG. 14, a grating unit 40 includes N second electrodes, where N is a positive integer greater than 1. Along the first direction X, voltages of the first second electrode 22 to the Q-th second electrode 22 vary linearly according to a third rate K3 of change, and voltages of the (Q+1)-th second electrode 22 to the N-th second electrode 22 vary linearly according to a fourth rate K4 of change, where 1<Q<N. An absolute value of the third rate K3 of change is not equal to an absolute value of the fourth rate K4 of change. In the same grating unit 40, along the first direction X, the variations of the voltages of various second electrodes 22 follow a broken-line trend.

Exemplarily, referring to FIG. 12, an electrode group 50 includes a first electrode 21 and a second electrode 22. Second electrodes 22 include a first sub-second electrode 221, a second sub-second electrode 222, ..., a Q-th sub-second electrode 22Q, a (Q+1)-th sub-second electrode 22Q1, ... and an N-th sub-second electrode 22N which are arranged in order. In the same grating unit 40, the first sub-second electrode 221 is the first second electrode 22, the second sub-second electrode 222 is the second second electrode 22, the Q-th sub-second electrode 22Q is the Q-th second electrode 22, the (Q+1)-th sub-second electrode 22Q1 is the (Q+1)-th second electrode 22, and the N-th sub-second electrode 22N is the N-th second electrode 22. Voltages of the first sub-second electrode 221 to the Q-th sub-second electrode 22Q vary linearly according to the third rate K3 of change. Voltages of the (Q+1)-th sub-second electrode 22Q1 to the N-th sub-second electrode 22N vary linearly according to the fourth rate K4 of change.

Figure 15:
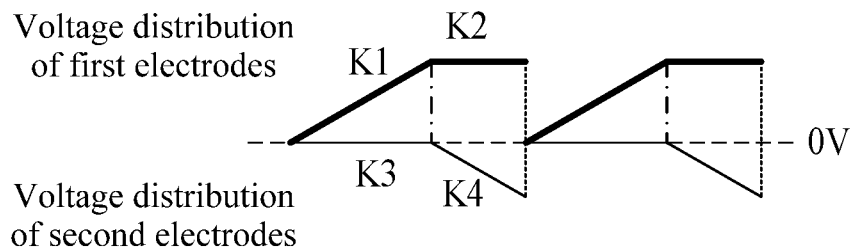
FIG. 15 is another diagram showing the voltage distribution of first electrodes and second electrodes according to an embodiment of the present disclosure.

FIG. 15 is another diagram showing the voltage distribution of first electrodes and second electrodes according to an embodiment of the present disclosure. Referring to FIG. 12 to FIG. 15 and FIG. 6, M=N, and P=Q. An electrode group 50 includes a first electrode 21 and a second electrode 22. The number of first electrodes 21 is equal to the number of second electrodes 22. The second rate K2 of change and the third rate K3 of change equals to 0, and the absolute value of the first rate K1 of change is equal to the absolute value of the fourth rate K4 of change. The first rate K1 of change is a positive number, and the fourth rate K4 of change is a negative number. A difference between the first rate K1 of change and the third rate K3 of change is equal to a difference between the second rate K2 of change and the fourth rate K4 of change. Therefore, along the first direction X, first voltage differences corresponding to various electrode groups 50 vary linearly.

Figure 16:
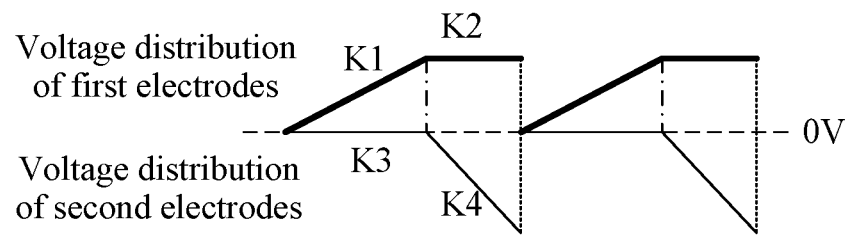
FIG. 16 is another diagram showing the voltage distribution of first electrodes and second electrodes according to an embodiment of the present disclosure.
Figure 17:
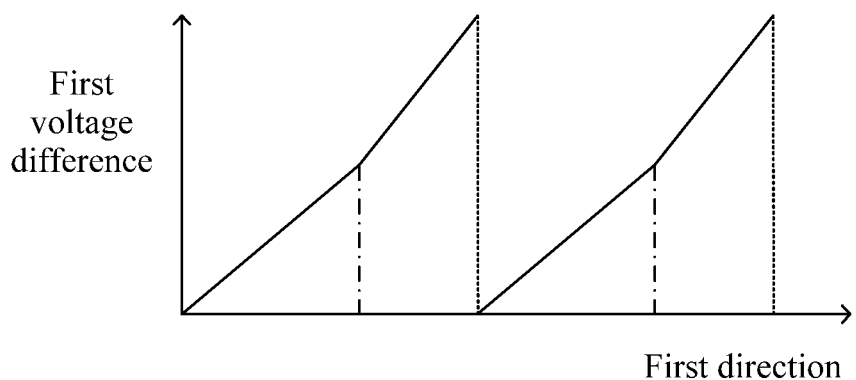
FIG. 17 is another diagram of first voltage differences according to an embodiment of the present disclosure.

FIG. 16 is another diagram showing the voltage distribution of first electrodes and second electrodes according to an embodiment of the present disclosure, and FIG. 17 is another diagram of first voltage differences according to an embodiment of the present disclosure. Referring to FIG. 12, FIG. 16 and FIG. 17, M=N, and P=Q. The second rate K2 of change and the third rate K3 of change equals to 0, and the absolute value of the first rate K1 of change is less than the absolute value of the fourth rate K4 of change. The difference between the first rate K1 of change and the third rate K3 of change is less than the difference between the second rate K2 of change and the fourth rate K4 of change. Therefore, along the first direction X, first voltage differences corresponding to the first electrode group 50 to the P-th electrode group 50 vary linearly, and first voltage differences corresponding to the (P+1)-th electrode group 50 to the M-th electrode group 50 vary linearly. The variations of first voltage differences corresponding to the first electrode group 50 to the M-th electrode group 50 follow a broken-line trend. A rate of change of the first voltage differences corresponding to the (P+1)-th electrode group 50 to the M-th electrode group 50 is greater than a rate of change of the first voltage differences corresponding to the first electrode group 50 to the P-th electrode group 50.

Figure 18:
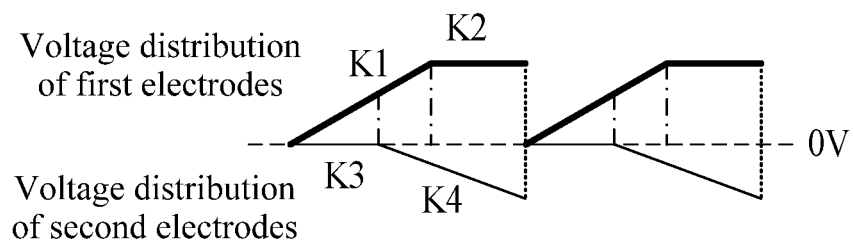
FIG. 18 is another diagram showing the voltage distribution of first electrodes and second electrodes according to an embodiment of the present disclosure.
Figure 19:
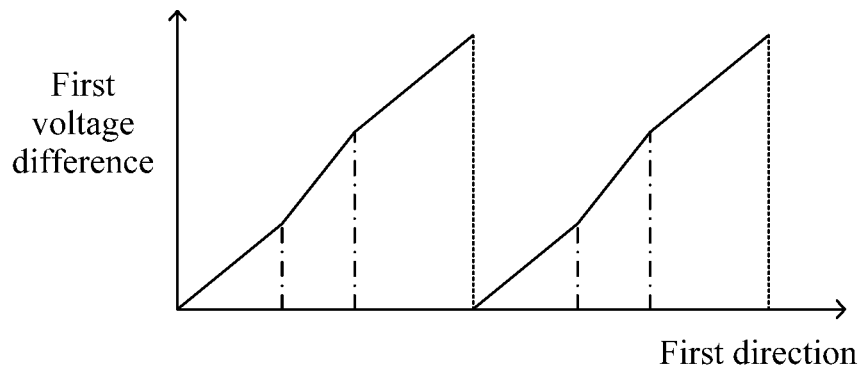
FIG. 19 is another diagram of first voltage differences according to an embodiment of the present disclosure.

FIG. 18 is another diagram showing the voltage distribution of first electrodes and second electrodes according to an embodiment of the present disclosure, and FIG. 19 is another diagram of first voltage differences according to an embodiment of the present disclosure. Referring to FIG. 18 and FIG. 19, M is equal to N, and P is not equal to Q. Each of the second rate K2 of change and the third rate K3 of change equals to 0, and the absolute value of the first rate K1 of change is equal to the absolute value of the fourth rate K4 of change. The variations of the first voltage differences corresponding to the first electrode group 50 to the M-th electrode group 50 follow a broken-line trend. The broken line representing the first voltage differences corresponding to the first electrode group 50 to the M-th electrode group 50 includes three line segments.

Figure 20:
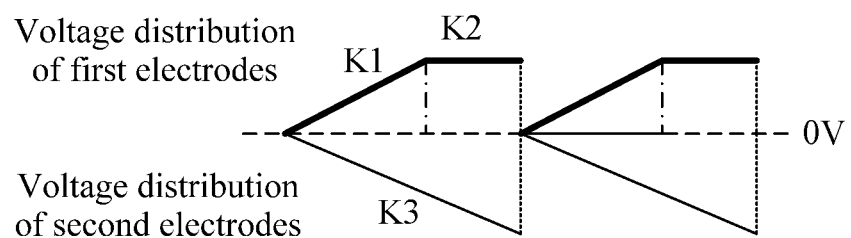
FIG. 20 is another diagram showing the voltage distribution of first electrodes and second electrodes according to an embodiment of the present disclosure.
Figure 21:
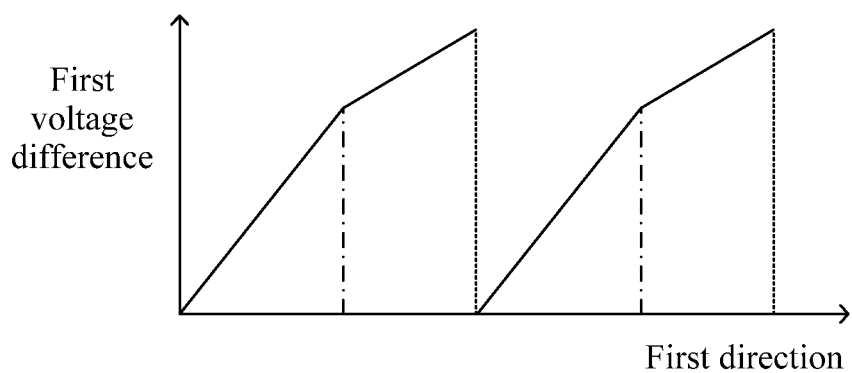
FIG. 21 is another diagram of first voltage differences according to an embodiment of the present disclosure.

FIG. 20 is another diagram showing the voltage distribution of first electrodes and second electrodes according to an embodiment of the present disclosure, and FIG. 21 is another diagram of first voltage differences according to an embodiment of the present disclosure. Referring to FIG. 12, FIG. 20 and FIG. 21, a grating unit 40 includes M electrode groups 50. Along the first direction X, voltages of the first first electrode 21 to the P-th first electrode 21 vary linearly according to the first rate K1 of change, and voltages of the (P+1)-th first electrode 21 to the M-th first electrode 21 vary linearly according to the second rate K2 of change, where 1<P<M. The first rate K1 of change is a positive number, and the second rate K2 of change is 0. Along the first direction X, voltages of the first second electrode 22 to the N-th second electrode 22 vary linearly according to the third rate K3 of change, where the third rate K3 of change is a negative number. First voltage differences corresponding to the first electrode group 50 to the P-th electrode group 50 vary linearly. First voltage differences corresponding to the (P+1)-th electrode group 50 to the M-th electrode group 50 vary linearly. The variations of the first voltage differences corresponding to the first electrode group 50 to the M-th electrode group 50 follow a broken-line trend, and the broken line representing the first voltage differences corresponding to the first electrode group 50 to the M-th electrode group 50 includes two line segments.

Figure 22:
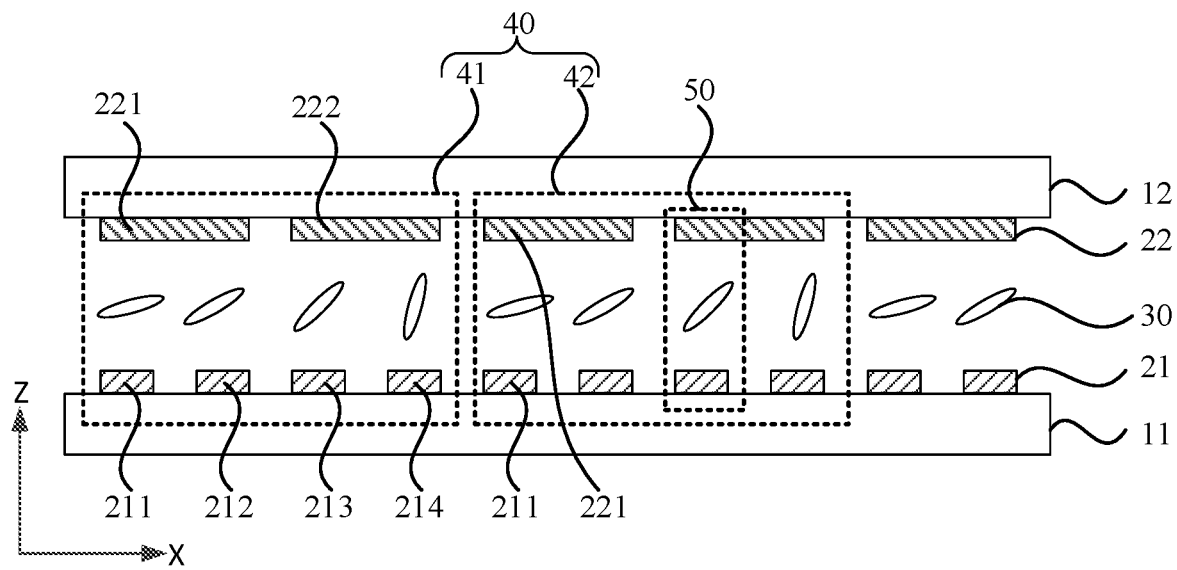
FIG. 22 is a sectional view of another liquid crystal grating according to an embodiment of the present disclosure.

FIG. 22 is a sectional view of another liquid crystal grating according to an embodiment of the present disclosure. Referring to FIG. 22, along the direction perpendicular to the plane where the first substrate 11 is located, multiple first electrodes 21 overlap the same second electrode 22. One first electrode 21 and part of a second electrode 22 are located in the same electrode group 50. Multiple electrode groups 50 share the same second electrode 22. In other implementations, along the direction perpendicular to the plane where the first substrate 11 is located, multiple second electrodes 22 overlap the same first electrode 21.

Exemplarily, referring to FIG. 22, along the direction perpendicular to the plane where the first substrate 11 is located, the first sub-first electrode 211 and the second sub-first electrode 212 both overlap the first sub-second electrode 221, and the third sub-first electrode 213 and the fourth sub-first electrode 214 both overlap the second sub-second electrode 222.

Optionally, referring to FIG. 4, along the first direction X, various first electrodes 1 have the same width, that is, any two adjacent first electrodes 21 have the same width. Along the first direction X, various second electrodes 22 have the same width, that is, any two adjacent second electrodes 22 have the same width.

Exemplarily, referring to FIG. 4, along the first direction X, the first electrode 21 and the second electrode 22 have the same width.

Figure 23:
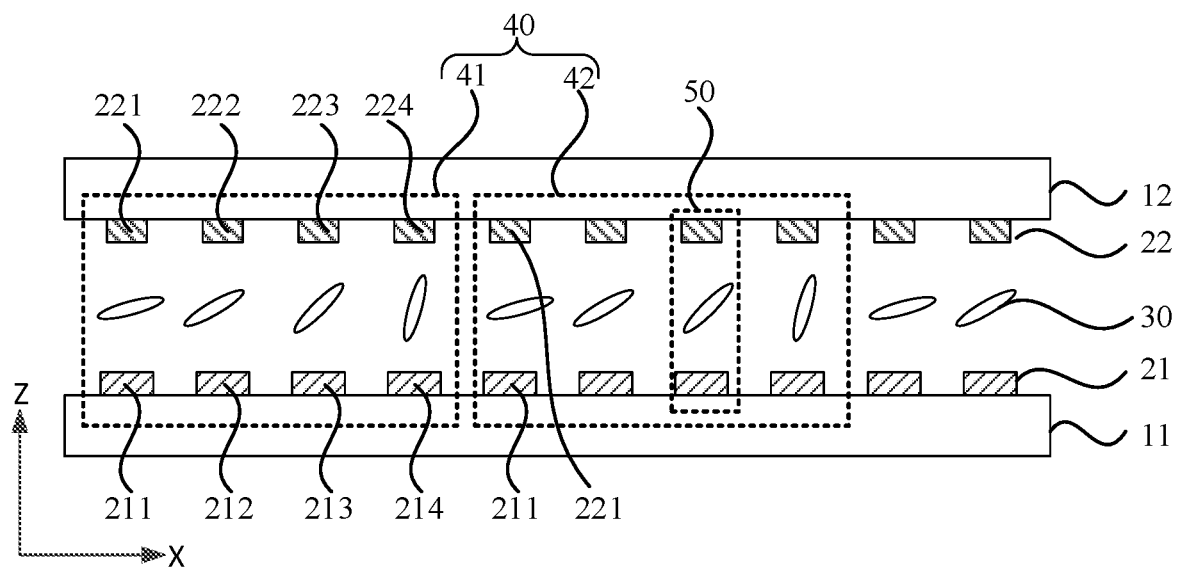
FIG. 23 is a sectional view of another liquid crystal grating according to an embodiment of the present disclosure.

FIG. 23 is a sectional view of another liquid crystal grating according to an embodiment of the present disclosure. Referring to FIG. 23, along the first direction X, various first electrodes 1 have the same width, various second electrodes 22 have the same width, and the first electrode 21 and the second electrode 22 have different widths. The width of the first electrode 21 is greater than the width of the second electrode 22. In other implementations, the width of the first electrode 21 is less than the width of the second electrode 22.

Figure 24:
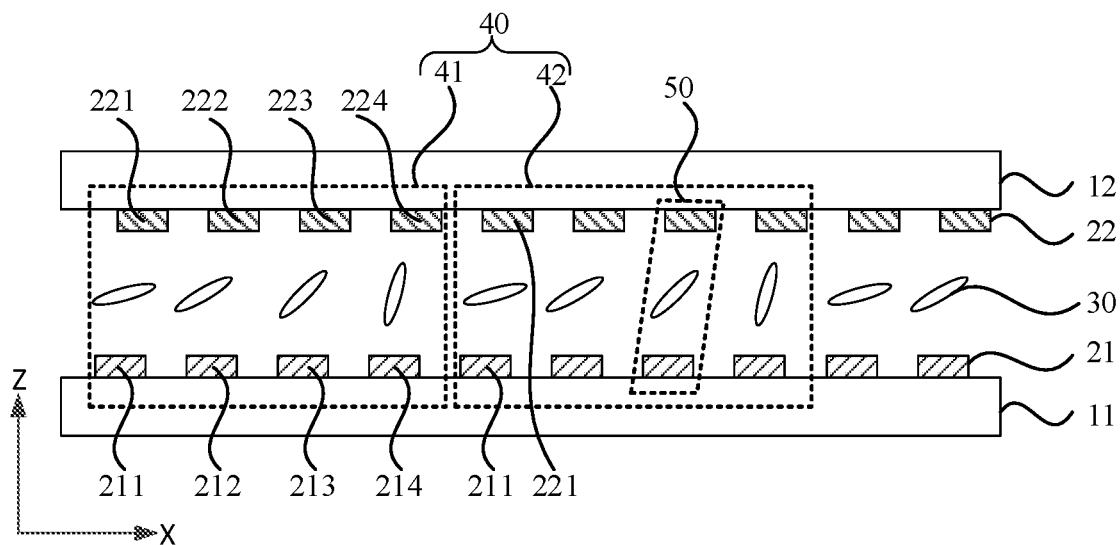
FIG. 24 is a sectional view of another liquid crystal grating according to an embodiment of the present disclosure.

FIG. 24 is a sectional view of another liquid crystal grating according to an embodiment of the present disclosure. In the same electrode group 50, the first electrode 21 and the second electrode 22 are staggered along the first direction X. In the same electrode group 50, the direction of the electric field formed between the first electrode 21 and the second electrode 22 intersects the third direction Z.

Optionally, referring to FIG. 4, along the first direction X, various first electrodes 21 are arranged at equal intervals, the various first electrodes 21 are arranged uniformly, and the distance between two adjacent first electrodes 21 is a fixed value. Various second electrodes are arranged at equal intervals, the various second electrodes are arranged uniformly, and the distance between two adjacent second electrodes 22 is a fixed value.

Optionally, referring to FIG. 3 and FIG. 4, the first electrodes 21 and the second electrodes 22 are all strip-shaped electrodes which extend along a second direction Y, where the first direction X intersects the second direction Y. Multiple first electrodes 21 extend along the second direction Y and are arranged along the first direction X, and multiple second electrodes 22 extend along the second direction Y and are arranged along the first direction X.

Optionally, referring to FIG. 4, in the same grating unit 40, at least some adjacent first electrodes 21 have the same voltage difference; and/or, at least some adjacent second electrodes 22 have the same voltage difference.

Exemplarily, referring to FIG. 4, the voltage of the first sub-first electrode 211 is +0.5V, the voltage of the second sub-first electrode 212 is +1V, the voltage of the third sub-first electrode 213 is +1.5V, and the voltage of the fourth sub-first electrode 214 is +2V. A voltage difference between the second sub-first electrode 212 and the first sub-first electrode 211 is 0.5V, a voltage difference between the third sub-first electrode 213 and the second sub-first electrode 212 is 0.5V, and a voltage difference between the fourth sub-first electrode 214 and the third sub-first electrode 213 is 0.5V. Voltage differences between adjacent first electrodes 21 are the same. The voltage of the first sub-second electrode 221 is −0.5V, the voltage of the second sub-second electrode 222 is −1V, the voltage of the third sub-second electrode 223 is −1.5V, and the voltage of the fourth sub-second electrode 224 is −2V. A voltage difference between the second sub-second electrode 222 and the first sub-second electrode 221 is −0.5V, a voltage difference between the third sub-second electrode 223 and the second sub-second electrode 222 is −0.5V, and a voltage difference between the fourth sub-second electrode 224 and the third sub-second electrode 223 is −0.5V. Voltage differences between adjacent second electrodes 22 are the same.

Optionally, referring to FIG. 4 and FIG. 9, in various grating units 40, first electrodes 21 of the same ordinal number have the same voltage, and second electrodes 22 of the same ordinal number have the same voltage. Multiple first electrodes 21 in various grating units 40 have the same voltage distribution rule, and multiple second electrodes 22 in various gating units 40 have the same voltage distribution rule. Therefore, first electrodes 21 having the same voltage in multiple grating units 40 may be connected to the same power supply terminal, and second electrodes 22 having the same voltage in multiple grating units 40 may be connected to the same power supply terminal, so that the number of power supply terminals is reduced. The ordinal number of a first electrode 21 or the ordinal number of a second electrode 22 in a grating unit 40 refers to the ranking of the first electrode 21 or the ranking of the second electrode 22 in the grating unit 40. The voltage distribution rule of first electrodes 21 or the voltage distribution rule of second electrodes 22 refers to a distribution rule of voltages of multiple first electrodes 21 or a distribution rule of voltages of multiple second electrodes 22 along the first direction X.

Exemplarily, referring to FIG. 4 and FIG. 9, grating units 40 include first grating subunits 41 and second grating subunits 42. A first grating subunit 41 and a second grating subunit 42 each include four electrode groups 50. An electrode group 50 includes a first electrode 21 and a second electrode 22. In a grating unit 40, four first electrodes 21 are arranged in order, and four second electrodes 22 are arranged in order. The first first electrode 21 in a first grating subunit 41 has the same voltage as the first first electrode 21 in a second grating subunit 42, and the second first electrode 21 in the first grating subunit 41 has the same voltage as the second first electrode 21 in the second grating subunit 42. The first second electrode 22 in the first grating subunit 41 has the same voltage as the first second electrode 22 in the second grating subunit 42, and the second second electrode 22 in the first grating subunit 41 has the same voltage as the second second electrode 22 in the second grating subunit 42.

Figure 25:
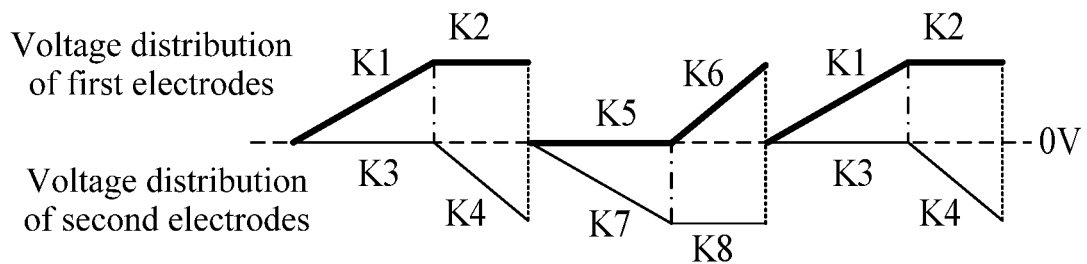
FIG. 25 is another diagram showing the voltage distribution of first electrodes and second electrodes according to an embodiment of the present disclosure.

FIG. 25 is another diagram showing the voltage distribution of first electrodes and second electrodes according to an embodiment of the present disclosure. Referring to FIG. 4 and FIG. 25, multiple grating units 40 include at least one first grating subunit 41 and at least one second grating subunit 42. A first grating subunit 41 is adjacent to a second grating subunit 42. First electrodes 21, which are of the same ordinal number, in the first grating subunit 41 and the second grating subunit 42 have different voltages, and/or second electrodes 22, which are of the same ordinal number, in the first grating subunit 41 and the second grating subunit 42 have different voltages. Multiple first electrodes 21 in the first grating subunit 41 and multiple first electrodes 21 in the second grating subunit 42 have different voltage distribution rules, and/or, multiple second electrodes 22 in the first grating subunit 41 and multiple second electrodes 22 in the second grating subunit 42 have different voltage distribution rules.

Exemplarily, referring to FIG. 4 and FIG. 25, in a first grating subunit 41, voltages of some first electrodes 21 having relatively small ordinal numbers vary linearly according to the first rate K1 of change, and voltages of some first electrodes 21 having relatively large ordinal numbers vary linearly according to the second rate K2 of change. Voltages of some second electrodes 22 having relatively small ordinal numbers vary linearly according to the third rate K3 of change, and voltages of some second electrodes 22 having relatively large ordinal numbers vary linearly according to the fourth rate K4 of change. In a second grating subunit 42, voltages of some first electrodes 21 having relatively small ordinal numbers vary linearly according to a fifth rate K5 of change, and voltages of some first electrodes 21 having relatively large ordinal numbers vary linearly according to a sixth rate K6 of change. Voltages of some second electrodes 22 having relatively small ordinal numbers vary linearly according to a seventh rate K7 of change, and voltages of some second electrodes 22 having relatively large ordinal numbers vary linearly according to an eighth rate K8 of change. The first rate K1 of change is not equal to the fifth rate K5 of change, and the second rate K2 of change is not equal to the sixth K6 rate of change. A voltage distribution rule of multiple first electrodes 21 in the first grating subunit 41 and a voltage distribution rule of multiple first electrodes 21 in the second grating subunit 42 are different. The third rate K3 of change is not equal to the seventh rate K7 of change, and the fourth rate K4 of change is not equal to the eighth rate K8 of change. A voltage distribution rule of various second electrodes 22 in the first grating subunit 41 and a voltage distribution rule of various second electrodes 22 in the second grating subunit 42 are different.

Exemplarily, referring to FIG. 4 and FIG. 25, the first rate K1 of change is equal to the sixth rate K6 of change, and the second rate K2 of change is equal to the fifth rate K5 of change. The third rate K3 of change is equal to the eighth rate K8 of change, and the fourth rate K4 of change is equal to the seventh rate K7 of change. First voltage differences corresponding to various electrode groups 50 in the first grating subunit 41 increase linearly, and first voltage differences corresponding to various electrode groups 50 in the second grating subunit 42 increase linearly. A rate of change of various first voltage differences in the first grating subunit 41 is equal to a rate of change of various first voltage differences in the second grating subunit 42. Along the first direction X, the first grating subunit 41 and the second grating subunit 42 have the same first voltage difference distribution; the first grating subunit 41 and the second grating subunit 42 have the same longitudinal electric field distribution; the first grating subunit 41 and the second grating subunit 42 have the same liquid crystal rotation angle distribution; the first grating subunit 41 and the second grating subunit 42 have the same refractive index gradient; thus the first grating subunit 41 and the second grating subunit 42 have the same light diffraction performance.

Optionally, referring to FIG. 4 and FIG. 9, along the first direction X, a second voltage difference exists between two closest first electrodes 21 which are located in two adjacent grating units 40, respectively, and a third voltage difference exists between two closest second electrodes 22 which are located in two adjacent grating units 40, respectively. The second voltage difference and the third voltage difference are not 0. A transverse electric field is generated between first electrodes 21 which are located in two adjacent grating units 40 respectively and between which the second voltage difference exists. A transverse electric field is generated between second electrodes 22 which are located in two adjacent grating units 40 respectively and between which the third voltage difference exists. In the embodiment of the present disclosure, transverse electric fields are distributed on the first substrate 11 and the second substrate 12, rather than concentrated on a single substrate, so that the intensity of the transverse electric field on a single substrate is reduced.

Exemplarily, referring to FIG. 4 and FIG. 9, along the first direction X, multiple first electrodes 21 in the first grating subunit 41 and multiple first electrodes 21 in the second grating subunit 42 have the same voltage distribution rule, and various second electrodes 22 in the first grating subunit 41 and various second electrodes 22 in the second grating subunit 42 have the same voltage distribution rule. The voltage distribution rule is a space distribution rule of voltages of various first electrodes 21 or various second electrodes 22 in the grating unit 40. In the first grating subunit 41 and the second grating subunit 42, along the first direction X, voltages of first electrodes 21 increase linearly, a jump occurs between the voltage of a first electrode 21 of the first grating subunit 41 and the voltage of a first electrode 21 of the second grating subunit 42, and the second voltage difference is the maximum value of the voltage difference between adjacent first electrodes 21. In the first grating subunit 41 and the second grating subunit 42, along the first direction X, voltages of second electrodes 22 decrease linearly, a jump occurs between the voltage of a second electrode 22 of the first grating subunit 41 and the voltage of a second electrode 22 of the second grating subunit 42, and the third voltage difference is the maximum value of the voltage difference between adjacent second electrodes 22. Therefore, second voltage differences and third voltage differences are distributed on the first substrate 11 and the second substrate 12, so that the value of the voltage difference on a single substrate is lowered, and the intensity of the transverse electric field on a single substrate is reduced.

Figure 26:
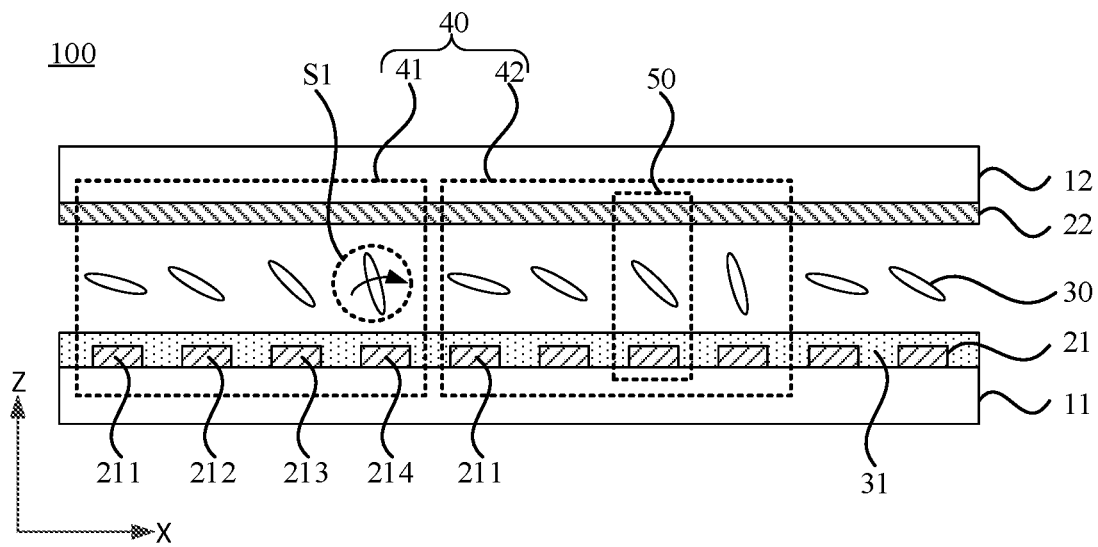
FIG. 26 is a sectional view of another liquid crystal grating in the research process.
Figure 27:
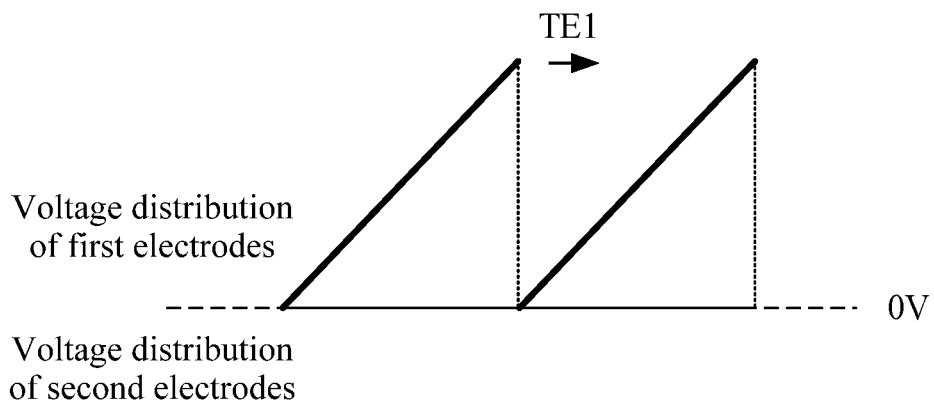
FIG. 27 is another diagram showing the voltage distribution of first electrodes and second electrodes of a liquid crystal grating in the research process.

FIG. 26 is a sectional view of another liquid crystal grating in the research process, and FIG. 27 is another diagram showing the voltage distribution of first electrodes and second electrodes of a liquid crystal grating in the research process. Referring to FIG. 26 and FIG. 27, according to the related research, it is found that along the first direction X, a first electric field TE1 is formed between two closest first electrodes 21 which are located in two adjacent grating units 40, respectively. The first electric field TE1 is a transverse electric field. The liquid crystal grating includes a first alignment layer 31. The first alignment layer 31 is located between first electrodes 21 and the liquid crystal layer 30. An alignment direction of the first alignment layer 31 is opposite to an electric field direction of the first electric field TE1. Under the combined impact of the first electric field TE1 and the longitudinal electric field, a liquid crystal molecule in region S1 rotates along the direction of the arrow in FIG. 1 and flips to an opposite direction, resulting in a bubble-like antiphase domain in region S1. The liquid crystal molecule in region S1 is close to the first electrode 21. That is, in addition to the impact of the strength of the transverse electric field, according to the related research, it is found that the alignment direction of the first alignment layer 31 being opposite to the electric field direction of the first electric field TE1 can easily lead to the problem of antiphase domains.

Figure 28:
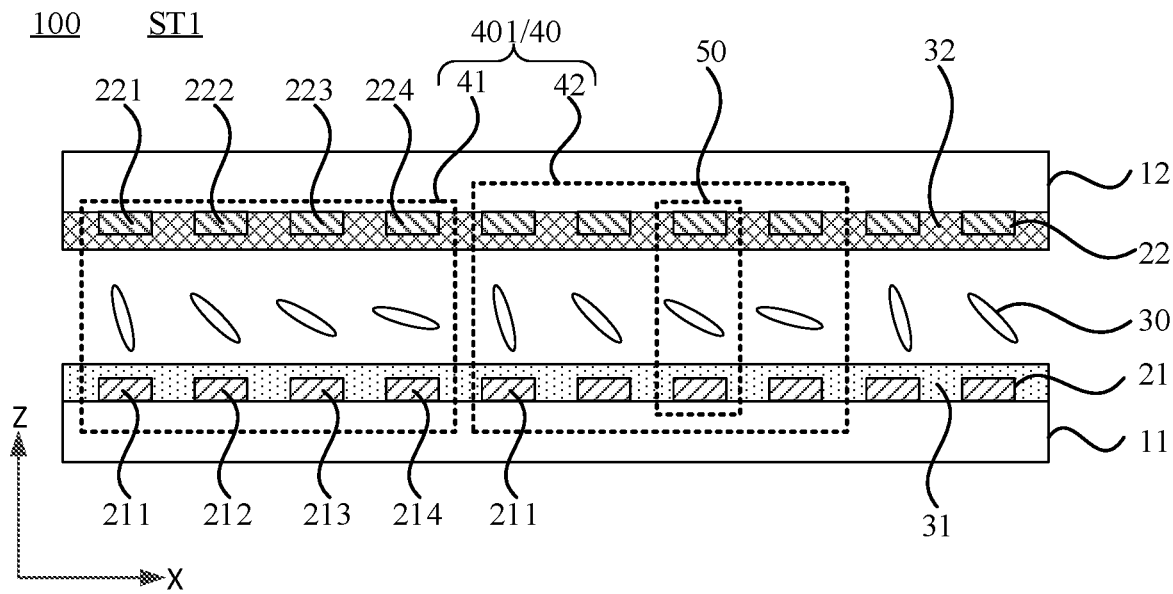
FIG. 28 is a sectional view of another liquid crystal grating according to an embodiment of the present disclosure.
Figure 29:
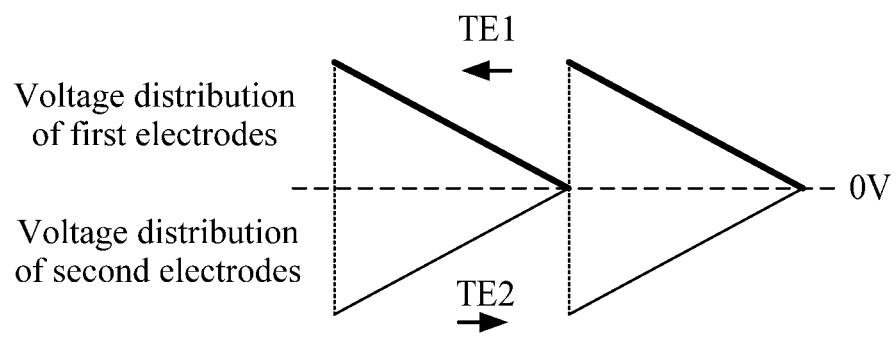
FIG. 29 is another diagram showing the voltage distribution of first electrodes and second electrodes of a liquid crystal grating according to an embodiment of the present disclosure.

FIG. 28 is a sectional view of another liquid crystal grating according to an embodiment of the present disclosure, and FIG. 29 is another diagram showing the voltage distribution of first electrodes and second electrodes of a liquid crystal grating according to an embodiment of the present disclosure. Referring to FIG. 28 and FIG. 29, the liquid crystal grating includes at least one liquid crystal cell 100. A liquid crystal cell 100 includes a first substrate 11, first electrodes 21, a first alignment layer 31, a liquid crystal layer 30 and a second substrate 12 which are disposed sequentially. In a first state ST1, the liquid crystal cell 100 includes multiple first grating units 401 which are arranged along the first direction X. A first grating unit 401 includes multiple first electrodes 21 which are disposed at intervals from each other along the first direction X. Along the first direction X, a certain distance exists between two adjacent first electrodes 21. Along the first direction X, a first electric field TE1 is formed between two closest first electrodes 21 which are located in two adjacent first grating units 401 respectively. In the liquid crystal cell 100, the alignment direction of the first alignment layer 31 is the same as the electric field direction of the first electric field TE1. The electric field direction affecting liquid crystal molecules close to the first alignment layer 31 is towards the alignment direction of the first alignment layer 31, and will not be towards the direction opposite to the alignment direction of the first alignment layer 31; the liquid crystal molecules close to the first alignment layer 31 will not flip to an opposite direction, so that the adverse impact of the transverse electric field on the rotation of the liquid crystal molecules is reduced and the problem of antiphase domains is alleviated.

The liquid crystal cell 100 further includes a second alignment layer 32. The second alignment layer 32 is located between second electrodes 22 and the liquid crystal layer 30. In the first state ST1, a first grating unit 401 includes multiple second electrodes 22 which are disposed at intervals from each other along the first direction X. Along the first direction X, a certain distance exists between two adjacent second electrodes 22. Along the first direction X, a second electric field TE2 is formed between two closest second electrodes 22 which are located in two adjacent first grating units 401 respectively. The second electric field TE2 is a transverse electric field. In the liquid crystal cell 100, an alignment direction of the second alignment layer 32 is the same as an electric field direction of the second electric field TE2. The electric field direction affecting liquid crystal molecules close to the second alignment layer 32 is towards the alignment direction of the second alignment layer 32, and will not be towards the direction opposite to the alignment direction of the second alignment layer 32; the liquid crystal molecules close to the second alignment layer will not flip to an opposite direction, so that the adverse impact of the transverse electric field on the rotation of the liquid crystal molecules is reduced and the problem of antiphase domains is alleviated.

Figure 30:
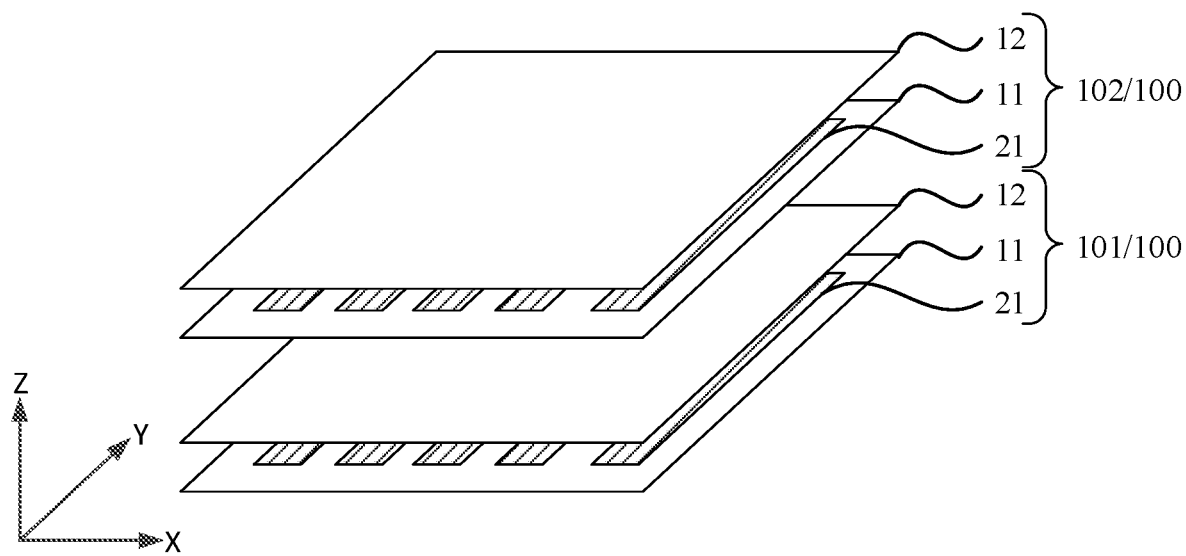
FIG. 30 is a diagram showing the three-dimensional structure of another liquid crystal grating according to an embodiment of the present disclosure.
Figure 31:
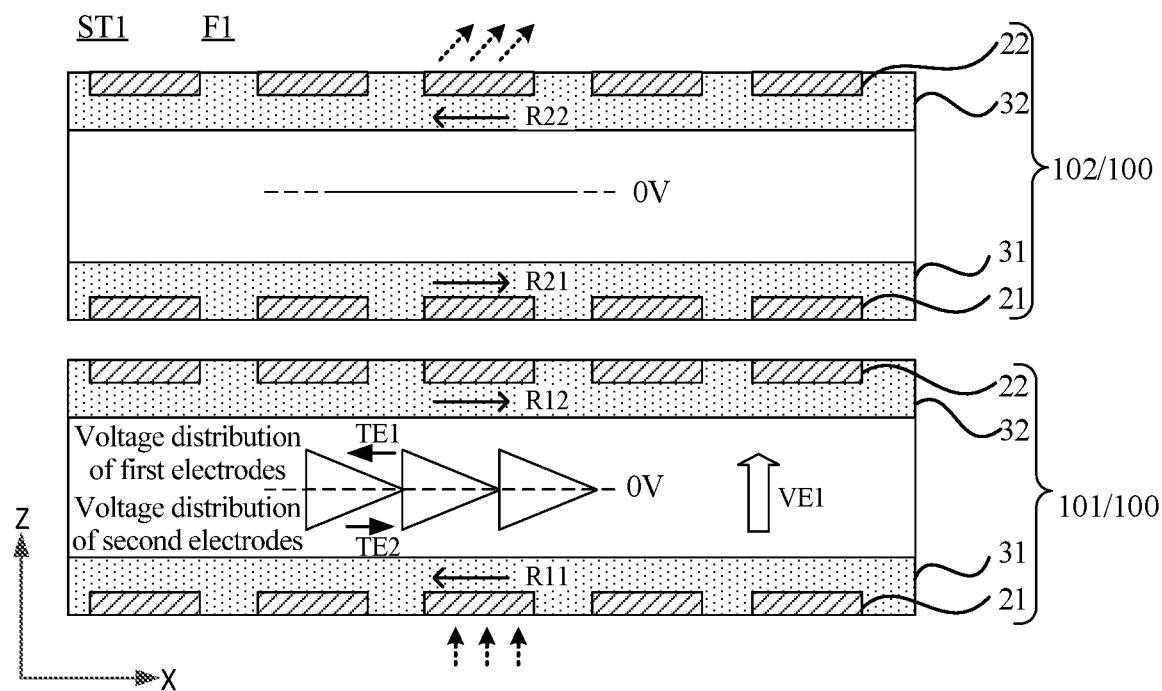
FIG. 31 is a diagram showing the operating process of another liquid crystal grating according to an embodiment of the present disclosure.

FIG. 30 is a diagram showing the three-dimensional structure of another liquid crystal grating according to an embodiment of the present disclosure, and FIG. 31 is a diagram showing the operating process of another liquid crystal grating according to an embodiment of the present disclosure. Referring to FIG. 28, FIG. 30 and FIG. 31, the liquid crystal grating includes two liquid crystal cells 100 which are stacked, and the two liquid crystal cells 100 are a first liquid crystal cell 101 and a second liquid crystal cell 102 respectively. The alignment direction of the first alignment layer 31 in the first liquid crystal 101 is denoted as a first alignment direction R11. The alignment direction of the first alignment layer 31 in the second liquid crystal 102 is denoted as a second alignment direction R21. The alignment direction of the second alignment layer 32 in the first liquid crystal 101 is denoted as a third alignment direction R12. The alignment direction of the second alignment layer 32 in the second liquid crystal 102 is denoted as a fourth alignment direction R22. In the first state ST1, in the first liquid crystal cell 101, the first alignment direction R11 is the same as the electric field direction of the first electric field TE1, so that liquid crystal molecules close to the first alignment layer 31 will not flip to an opposite direction. In the first state ST1, in the first liquid crystal cell 101, the third alignment direction R12 is the same as the electric field direction of the second electric field TE2, so that liquid crystal molecules close to the second alignment layer 32 will not flip to an opposite direction. The first alignment direction R11 is opposite to the third alignment direction R12. In the first state ST1, in the first liquid crystal cell 101, a first longitudinal electric field VET is formed between the first electrode 21 and the second electrode 22, and a direction of the first longitudinal electric field VET is the third direction Z, pointing from the first electrode 21 to the second electrode 22.

Figure 32:
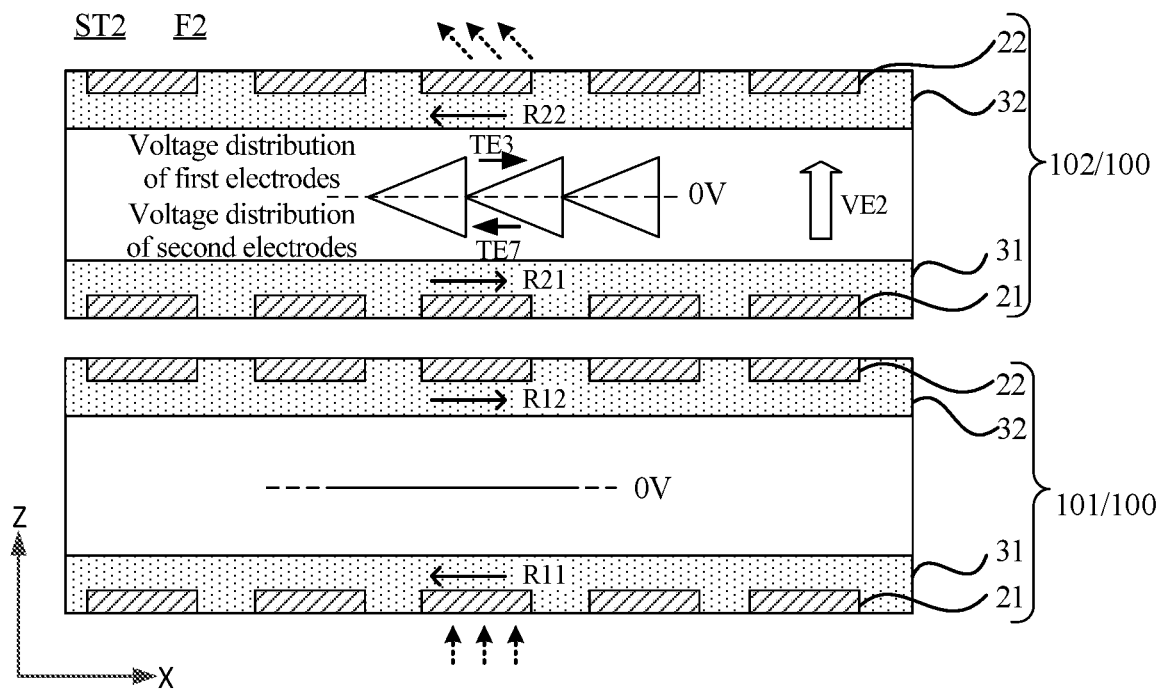
FIG. 32 is a diagram showing the operating process of another liquid crystal grating according to an embodiment of the present disclosure.

FIG. 32 is a diagram showing the operating process of another liquid crystal grating according to an embodiment of the present disclosure. Referring to FIG. 28, FIG. 30 and FIG. 32, in a second state ST2, in the second liquid crystal cell 102, the second alignment direction R21 is the same as an electric direction of a third electric field TE3, so that liquid crystal molecules close to the first alignment layer 31 will not flip to an opposite direction. In the second state ST2, in the second liquid crystal cell 102, the fourth alignment direction R22 is the same as an electric field direction of a seventh electric field TE7, so that liquid crystal molecules close to the second alignment layer 32 will not flip to an opposite direction. The second alignment direction R21 is opposite to the fourth alignment direction R22. In the second liquid crystal cell 102, in the second state ST2, along the first direction X, the seventh electric field TE7 is formed between two closest second electrodes 22 which are located in two adjacent grating units 40 respectively. The seventh electric field TE7 is a transverse electric field. In the second state ST2, in the second liquid crystal cell 102, a second longitudinal electric field VE2 is formed between the first electrode 21 and the second electrode 22, and a direction of the second longitudinal electric field VE2 is the third direction Z, pointing from the first electrode 21 to the second electrode 22.

Figure 33:
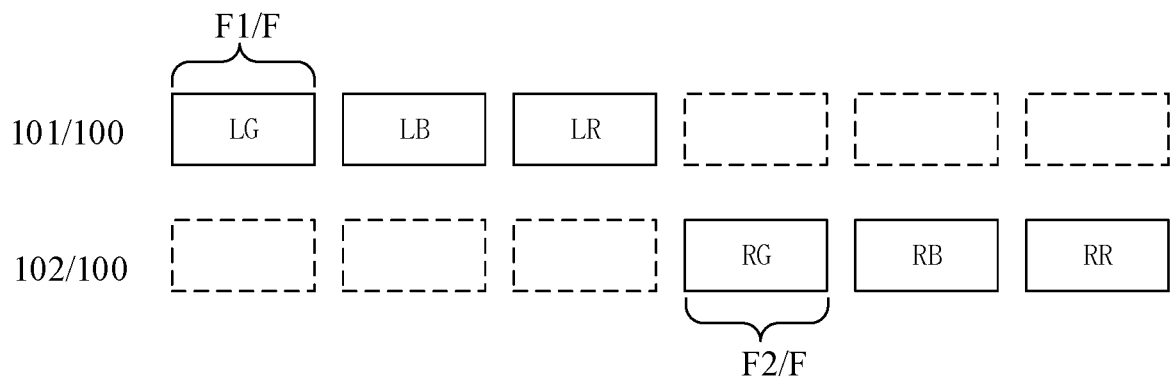
FIG. 33 is a timing graph showing the operations of a liquid crystal grating according to an embodiment of the present disclosure.

FIG. 33 is a timing graph showing the operations of a liquid crystal grating according to an embodiment of the present disclosure. Referring to FIG. 28 to FIG. 33, the liquid crystal grating includes two liquid crystal cells 100 which are stacked. The operating time of the liquid crystal grating includes multiple frames F. In the same frame F, one of the two liquid crystal cells 100 is mainly configured for light diffraction and deflection, and the other one of the two liquid crystal cells 100 is not configured for or assists in light deflection. The deflection angle of light is mainly determined by one of the two liquid crystal cells 100.

Exemplarily, referring to FIG. 33, a frame F refers to a time period during which light of a color illuminates an eye of the observer. For a scheme using three primary colors, that is, red, green and blue (RGB), for color display, a complete image during stereoscopic display requires six frames. These six frames are a left-eye green frame LG, a left-eye blue frame LB, a left-eye red frame LR, a right-eye green frame RG, a right-eye blue frame RB and a right-eye red frame RR, respectively. Dashed boxes in FIG. 33 indicate that the liquid crystal cell is not used for or assists in light deflection. For example, in the left-eye green frame LG, the first liquid crystal cell 101 is mainly configured to diffract and deflect light to the left eye of the observer, and the second liquid crystal cell 102 is not used for or assists in light deflection. In the right-eye green frame RG, the first liquid crystal cell 101 is not used for or assists in light deflection, and the second liquid crystal cell 102 is mainly configured to diffract and deflect light to the right eye of the observer.

Optionally, referring to FIG. 28 to FIG. 33, the two liquid crystal cells 100 are the first liquid crystal cell 101 and the second liquid crystal cell 102 respectively. The frames F include first frames F1 and second frames F2, and the second frames F2 are placed after the first frames F1. In the first frames F1, the first liquid crystal cell 101 operates in the first state ST1 and is configured mainly to diffract and deflect light towards the first side of an optical axis of the liquid crystal grating. In the second frames F2, the second liquid crystal cell 102 operates in the second state ST2 and is configured mainly to diffract and deflect light towards the second side of the optical axis of the liquid crystal grating, where the first side and the second side are located at two opposite sides of the optical axis of the liquid crystal grating. The optical axis of the liquid crystal grating is perpendicular to the plane where the first substrate 11 is located.

Exemplarily, referring to FIG. 31 an FIG. 33, in the first frames F1, the first liquid crystal cell 101 operates in the first state ST1, and the first liquid crystal cell 101 is configured mainly to diffract and deflect light towards the first side of the optical axis of the liquid crystal grating. The first side of the optical axis of the liquid crystal grating is the right side of the optical axis of the liquid crystal grating. For the observer facing the direction of light propagation, green light (green light is used for illustration but is not limiting) is deflected into the left eye of the observer.

Exemplarily, referring to FIG. 32 and FIG. 33, in the second frames F2, the second liquid crystal cell 102 operates in the second state ST2, and the second liquid crystal cell 102 is configured mainly to diffract and deflect light towards the second side of the optical axis of the liquid crystal grating. The second side of the optical axis of the liquid crystal grating is the left side of the optical axis of the liquid crystal grating. For the observer facing the direction of light propagation, green light (green light is used for illustration but is not limiting) is deflected into the right eye of the observer.

Figure 34:
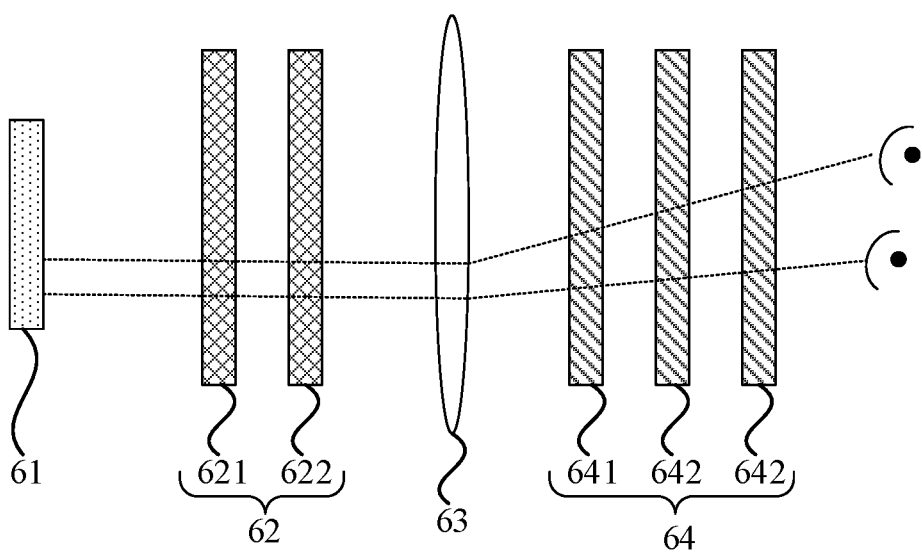
FIG. 34 is a diagram of a stereoscopic display device according to an embodiment of the present disclosure.

FIG. 34 is a diagram of a stereoscopic display device according to an embodiment of the present disclosure. Referring to FIG. 34, the stereoscopic display device includes a light source 61, a spatial light modulator 62 and a gating component 64 which are disposed sequentially. The gating component 64 includes at least one liquid crystal grating in the preceding embodiments.

Exemplarily, referring to FIG. 34, the light source 61 is used for emitting coherent backlight of three colors, that is, red light, green light and blue light, in a timing sequence. The spatial light modulator 62 includes a first spatial light modulator 621 for phase modulation and a second spatial light modulator 622 for amplitude modulation. The stereoscopic display device further includes a field lens 63, which is located between the spatial light modulator 62 and the grating component 64. The field lens 63 is at least used for improving the capability of edge light of light emitted by the spatial light modulator 62 to be incident into the grating component 64. The grating component 64 is used for forming left-eye images and right-eye images based on the incident light.

Exemplarily, referring to FIG. 34, the grating component 64 includes three liquid crystal gratings. The three liquid crystal gratings are a first liquid crystal grating 641, a second liquid crystal grating 642 and a third liquid crystal grating 643 respectively. Any two of first electrodes 21 of the first liquid crystal grating 641, first electrodes 21 of the second liquid crystal grating 642 and first electrodes 21 of the third liquid crystal grating 643 may have different extension directions. In other implementations, the grating component 64 may also include liquid crystal gratings of other numbers.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A liquid crystal grating, comprising a first substrate, a second substrate and a liquid crystal layer, wherein the liquid crystal layer is located between the first substrate and the second substrate;

wherein the liquid crystal grating comprises a plurality of grating units which are arranged along a first direction, wherein a grating unit of the plurality of grating units comprises a plurality of first electrodes and a plurality of second electrodes; wherein the plurality of first electrodes are located between the first substrate and the liquid crystal layer and are disposed at intervals from each other along the first direction; the plurality of second electrodes are located between the second substrate and the liquid crystal layer and are disposed at intervals from each other along the first direction; and at least two first electrodes of the plurality of first electrodes have different voltages, and at least two second electrodes of the plurality of second electrodes have different voltages; and wherein the grating unit comprises M first electrodes, wherein M is a positive integer greater than 1;

along the first direction, voltages of a first first electrode to a P-th first electrode vary linearly according to a first rate of change, and voltages of a (P+1)-th first electrode to an M-th first electrode vary linearly according to a second rate of change, wherein $1<P<M$; and an absolute value of the first rate of change is not equal to an absolute value of the second rate of change.

2. The liquid crystal grating according to claim 1, wherein a same grating unit of the plurality of grating units comprises a plurality of electrode groups which are arranged along the first direction, and an electrode group of the plurality of electrode groups comprises at least one first electrode and at least one second electrode;

in a same electrode group of the plurality of electrode groups, a first electrode at least partially overlaps a second electrode, and a voltage difference between the first electrode and the second electrode is a first voltage difference.

3. The liquid crystal grating according to claim 2, wherein first voltage differences have a same polarity.

4. The liquid crystal grating according to claim 2, wherein in the same grating unit, along the first direction, first voltage differences gradually increase or gradually decrease.

5. The liquid crystal grating according to claim 4, wherein the grating unit comprises M electrode groups, wherein M is a positive integer greater than 1; and in the same grating unit, along the first direction, first voltage differences corresponding to a first electrode group to an M-th electrode group vary linearly.

6. The liquid crystal grating according to claim 1, wherein in a same grating unit of the plurality of grating units, along the first direction, voltages of first electrodes gradually increase, and voltages of second electrodes gradually decrease; or in a same grating unit of the plurality of grating units, along the first direction, voltages of first electrodes gradually decrease, and voltages of second electrodes gradually increase.

7. The liquid crystal grating according to claim 6, wherein the grating unit comprises M first electrodes and N second electrodes, wherein M and N are each a positive integer greater than 1; and along the first direction, voltages of a first first electrode to an M-th first electrode vary linearly, and voltages of a first second electrode to an N-th second electrode vary linearly.

8. The liquid crystal grating according to claim 1, wherein the grating unit comprises N second electrodes, wherein M is a positive integer greater than 1;

along the first direction, voltages of a first second electrode to a Q-th second electrode vary linearly according to a third rate of change, and voltages of a (Q+1)-th second electrode to an N-th second electrode vary linearly according to a fourth rate of change, wherein $1<Q<N$; and an absolute value of the third rate of change is not equal to an absolute value of the fourth rate of change.

9. The liquid crystal grating according to claim 8, wherein M=N, and P=Q; and each of the second rate of change and the third rate of change equals to 0, and the absolute value of the first rate of change is equal to the absolute value of the fourth rate of change.

10. The liquid crystal grating according to claim 1, wherein along a direction perpendicular to a plane where the first substrate is located, the plurality of first electrodes overlap a same second electrode, or the plurality of second electrodes overlap a same first electrode.

11. The liquid crystal grating according to claim 1, wherein along the first direction, the plurality of first electrodes have a same width, and the plurality of second electrodes have a same width.

12. The liquid crystal grating according to claim 1, wherein along the first direction, the plurality of first electrodes are arranged at equal intervals, and the plurality of second electrodes are arranged at equal intervals.

13. The liquid crystal grating according to claim 1, wherein the plurality of first electrodes and the plurality of second electrodes are all strip-shaped electrodes which extend along a second direction, wherein the first direction intersects the second direction.

14. The liquid crystal grating according to claim 1, wherein in a same grating unit of the plurality of grating units, at least one of the following is satisfied: at least two adjacent first electrodes have a same voltage difference; or at least two adjacent second electrodes have a same voltage difference.

15. The liquid crystal grating according to claim 1, wherein in the plurality of grating units, first electrodes of a same ordinal number have a same voltage, and second electrodes of a same ordinal number have a same voltage.

16. The liquid crystal grating according to claim 1, wherein the plurality of grating units comprise at least one first grating subunit and at least one second grating subunit, a first grating subunit of the at least one first grating subunit is adjacent to a second grating subunit of the at least one second grating subunit, and at least one of the following is satisfied: first electrodes in the at least one first grating subunit and first electrodes in the at least one second grating subunit which are of a same ordinal number have different voltages, or second electrodes in the at least one first grating subunit and second electrodes in the at least one second grating subunit which are of a same ordinal number have different voltages.

17. The liquid crystal grating according to claim 1, wherein along the first direction, a second voltage difference exists between two closest first electrodes which are located in two adjacent grating units of the plurality of grating units, respectively, and a third voltage difference exists between two closest second electrodes which are located in the two adjacent grating units, respectively.

18. A liquid crystal grating, comprising a first substrate, a second substrate and a liquid crystal layer, wherein the liquid crystal layer is located between the first substrate and the second substrate;

wherein the liquid crystal grating comprises a plurality of grating units which are arranged along a first direction, wherein a grating unit of the plurality of grating units comprises a plurality of first electrodes and a plurality of second electrodes; wherein the plurality of first electrodes are located between the first substrate and the liquid crystal layer and are disposed at intervals from each other along the first direction; the plurality of second electrodes are located between the second substrate and the liquid crystal layer and are disposed at intervals from each other along the first direction; and at least two first electrodes of the plurality of first electrodes have different voltages, and at least two second electrodes of the plurality of second electrodes have different voltages;

wherein the number of the plurality of first electrodes is the same as the number of the plurality of second electrodes; and along a direction perpendicular to a plane where the first substrate is located, the plurality of first electrodes correspond to the plurality of second electrodes one to one; and wherein for a first electrode and a second electrode which are in one-to-one correspondence, a voltage of the first electrode and a voltage of the second electrode have a same value and opposite polarities.

19. A stereoscopic display device, comprising a light source, a spatial light modulator and a grating component which are disposed sequentially, wherein the gating component comprises at least one liquid crystal grating according to claim 18.

20. A stereoscopic display device, comprising a light source, a spatial light modulator and a grating component which are disposed sequentially, wherein the gating component comprises at least one liquid crystal grating, and each liquid crystal grating of the at least one liquid crystal grating comprises:

a first substrate, a second substrate and a liquid crystal layer, wherein the liquid crystal layer is located between the first substrate and the second substrate;

wherein the liquid crystal grating comprises a plurality of grating units which are arranged along a first direction, wherein a grating unit of the plurality of grating units comprises a plurality of first electrodes and a plurality of second electrodes; wherein the plurality of first electrodes are located between the first substrate and the liquid crystal layer and are disposed at intervals from each other along the first direction; the plurality of second electrodes are located between the second substrate and the liquid crystal layer and are disposed at intervals from each other along the first direction; and at least two first electrodes of the plurality of first electrodes have different voltages, and at least two second electrodes of the plurality of second electrodes have different voltages; and wherein the grating unit comprises M first electrodes, wherein M is a positive integer greater than 1;

along the first direction, voltages of a first first electrode to a P-th first electrode vary linearly according to a first rate of change, and voltages of a (P+1)-th first electrode to an M-th first electrode vary linearly according to a second rate of change, wherein $1<P<M$; and an absolute value of the first rate of change is not equal to an absolute value of the second rate of change.

* * * * *